United States Patent
Kelsey et al.

(10) Patent No.: US 12,549,516 B2
(45) Date of Patent: Feb. 10, 2026

(54) SECURED NETWORK SWITCH AND METHOD FOR SECURE AND CONFIGURABLE FILTERING

(71) Applicant: SiliconDust USA Inc., Livermore, CA (US)

(72) Inventors: Nicholas John Kelsey, Glendale, AZ (US); Richard Finbarr Dunphy, Chandler, AZ (US)

(73) Assignee: SiliconDust USA Inc., Livermore, CA (US)

( * ) Notice: Subject to any disclaimer, the term of this patent is extended or adjusted under 35 U.S.C. 154(b) by 235 days.

(21) Appl. No.: 18/394,945

(22) Filed: Dec. 22, 2023

(65) Prior Publication Data
US 2025/0211567 A1 Jun. 26, 2025

(51) Int. Cl.
*H04L 9/40* (2022.01)
*H04L 61/5014* (2022.01)

(52) U.S. Cl.
CPC ...... *H04L 63/0227* (2013.01); *H04L 63/0236* (2013.01); *H04L 63/0263* (2013.01)

(58) Field of Classification Search
CPC ............. H04L 63/0227; H04L 61/4541; H04L 2101/604; H04L 2101/622; H04L 61/103; H04L 61/4511; H04L 61/5014; H04L 63/0263; H04L 63/0236
See application file for complete search history.

(56) References Cited

U.S. PATENT DOCUMENTS

| | | | | |
|---|---|---|---|---|
| 9,706,265 | B2 * | 7/2017 | Harrison | ............ H04N 21/4126 |
| 11,888,899 | B2 * | 1/2024 | Kumar | ..................... H04L 49/70 |
| 2013/0340050 | A1 * | 12/2013 | Harrison | ................. H04L 65/61 |
| | | | | 726/4 |
| 2015/0036494 | A1 * | 2/2015 | Kotecha | .................. H04L 65/00 |
| | | | | 370/312 |

(Continued)

FOREIGN PATENT DOCUMENTS

| | | | | |
|---|---|---|---|---|
| EP | 4576674 A1 * | 6/2025 | ........... | H04L 49/201 |
| WO | WO-2013156090 A1 * | 10/2013 | ......... | H04L 63/0236 |

OTHER PUBLICATIONS

Extended European Search Report issued May 26, 2025 in European Application No. 24221552.3.

(Continued)

*Primary Examiner* — Aftab N. Khan
(74) *Attorney, Agent, or Firm* — NovoTechIP International PLLC

(57) ABSTRACT

A secured network switch is configured to enforce security between devices on a home network to ensure vulnerable devices do not compromise assets on privileged devices. The secured switch operates at the data link layer and is configured to enforce security based on device management and enforcement. The switch is configured to only allow devices that have been classified to allow communication with each other to forward packets to each other. The switch is configured to use broadcast, multicast, and network neighbor management to control the device discovery through the switch. The secured switch will also gather device informa- (Continued)

tion by snooping various sources of device 'broadcast' information and present this information via a user interface to aid network administrators in classifying devices and creating device to device relationships.

20 Claims, 20 Drawing Sheets

(56) References Cited

U.S. PATENT DOCUMENTS

| | | | |
|---|---|---|---|
| 2016/0006696 A1* | 1/2016 | Donley | H04L 63/0236 709/223 |
| 2016/0006822 A1* | 1/2016 | Kloberdans | H04L 63/0272 709/204 |
| 2017/0093912 A1* | 3/2017 | Poomalai | H04L 63/162 |
| 2017/0187703 A1* | 6/2017 | Enrique Salpico | G06F 21/6218 |
| 2018/0034808 A1* | 2/2018 | Mohamad Abdul | H04L 63/102 |
| 2022/0060498 A1* | 2/2022 | Head, Jr. | H04L 12/4641 |
| 2024/0305662 A1* | 9/2024 | Kairali | H04L 63/0236 |

OTHER PUBLICATIONS

Extended European Search Report issued May 26, 2025 in European Application No. 24221485.6.

* cited by examiner

SECURED NETWORK SWITCH AND METHOD FOR SECURE AND CONFIGURABLE FILTERING

CROSS-REFERENCE TO RELATED APPLICATION

This patent application is related to commonly owned U.S. patent application Ser. No. (not yet assigned) entitled "Secured Network Switch and Method for Broadcast, Multicast, and Neighbor Management," which is incorporated herein by reference in its entirety.

TECHNICAL FIELD

The disclosure relates generally to computer networking, and, in particular, to systems and methods for creating and maintaining a network of devices which are secured from each other.

BACKGROUND

Securing home networks is paramount to protect personal information from cybercriminals who could use it for fraudulent activities like identity theft. Additionally, securing home networks can prevent others from accessing the internet connection, which can slow down the user's network speed and cause other issues. Finally, securing a home network can help prevent devices from being compromised, which can lead to data loss, ransomware attacks, and other types of cybercrime. However, home networks are getting harder to manage as people connect more devices, use new applications, and rely on them for entertainment, communication, and work. In addition, home users may lack the technical expertise to manage their home network.

Finding ways to improve security for and facilitate management of home networks is always a worthwhile endeavor.

SUMMARY

In one general aspect, the instant disclosure presents a secured network switch having a processor and a memory in communication with the processor wherein the memory stores executable instructions that, when executed by the processor alone or in combination with other processors, cause the secured network switch to perform multiple functions. The function may receiving a packet at a first port of a plurality of ports of the secured network switch, the ports including a gateway port connected to a gateway device; identifying a source device and a target device for the packet; performing, using the secured network switch, a first filtering process of a layer 2 filtering process on the packet, the first filtering process including: dropping the packet and ending the layer 2 filtering process when the source device is a banned device or if the source device is not a known device and the target device is not a gateway, a Domain Name System (DNS), or Dynamic Host Configuration Protocol (DHCP) device; and providing the packet to switch logic of the secured network switch when the source device is a known device or the target device is a gateway, DNS, or DHCP device; in response to providing the packet to the switch logic, processing the packet with the switch logic to identify an output port of the secured network switch via which to transmit the packet; and after processing the packet with the switch logic, performing a second filtering process of the layer 2 filtering process, the second filtering process including: dropping the packet and ending the layer 2 filtering process before transmitting the packet via the identified output port when there is no defined relationship between the source device and the target device; and transmitting the packet via the identified output port when there is a defined relationship between the source device and the target device.

In yet another general aspect, the instant disclosure presents a method for a secured network switch. The method includes: receiving a packet at a first port of the plurality of ports of the secured network switch; identifying a source device and a target device for the packet; performing, using the secured network switch, a first filtering process of a layer 2 filtering process on the packet, the first filtering process including: dropping the packet and ending the layer 2 filtering process when the source device is a banned device or if the source device is not a known device and the target device is not a gateway, a Domain Name System (DNS), or Dynamic Host Configuration Protocol (DHCP) device; and providing the packet to switch logic of the secured network switch when the source device is a known device or the target device is a gateway, DNS, or DHCP device; in response to providing the packet to the switch logic, processing the packet with the switch logic to identify an output port of the secured network switch via which to transmit the packet; and after processing the packet with the switch logic, performing a second filtering process of the layer 2 filtering process, the second filtering process including: dropping the packet and ending the layer 2 filtering process before transmitting the packet via the identified output port when there is no defined relationship between the source device and the target device; and transmitting the packet via the identified output port when there is a defined relationship between the source device and the target device.

In a further general aspect, the instant application describes a non-transitory computer readable medium on which are stored instructions that when executed cause a programmable device to perform functions of receiving a packet at a first port of the plurality of ports of the secured network switch; identifying a source device and a target device for the packet; performing, using the secured network switch, a first filtering process of a layer 2 filtering process on the packet, the first filtering process including: dropping the packet and ending the layer 2 filtering process when the source device is a banned device or if the source device is not a known device and the target device is not a gateway, a Domain Name System (DNS), or Dynamic Host Configuration Protocol (DHCP) device; and providing the packet to switch logic of the secured network switch when the source device is a known device or the target device is a gateway, DNS, or DHCP device; in response to providing the packet to the switch logic, processing the packet with the switch logic to identify an output port of the secured network switch via which to transmit the packet; and after processing the packet with the switch logic, performing a second filtering process of the layer 2 filtering process, the second filtering process including: dropping the packet and ending the layer 2 filtering process before transmitting the packet via the identified output port when there is no defined relationship between the source device and the target device; and transmitting the packet via the identified output port when there is a defined relationship between the source device and the target device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

A home network is a network that connects electronic devices, such as computers, printers, mobile phones, tablets, security cameras, home appliances, and the like, to each other and to the internet within a home. These days, nearly every device in a home can connect to the internet. Having the ability to connect to and control almost any device over a network provides a number of advantages. For example, homeowners can control and automate various tasks, such as adjusting the temperature, turning on lights, or locking doors, all with a few taps on a smartphone or through voice commands. This level of automation simplifies daily routines and saves time and effort. Networked devices can also enhance home security by enabling real-time monitoring and remote access. Smart cameras, motion sensors, and door/window sensors can be integrated into a comprehensive security system that sends alerts to homeowners' devices in case of any suspicious activities. Remote access allows homeowners to monitor their homes from anywhere, providing peace of mind and enhancing overall safety.

Unfortunately, home networked devices are often poorly secured which increases the possibility of these devices being compromised, which in turn can lead to the compromise of other devices on the network. For example, hackers can gain access to a home network via a vulnerable device to carry out a range of cybercrimes, such as installing malware or viruses on the devices on the network, accessing and/or gaining control of devices on the network, and acquiring personal data from devices for identity theft or other nefarious purposes. As the number of devices connected to a home network increases, the number of possible entry points to the home network for cyberattacks also increases. Implementing robust security measures is paramount to mitigating these risks.

Figure 1:
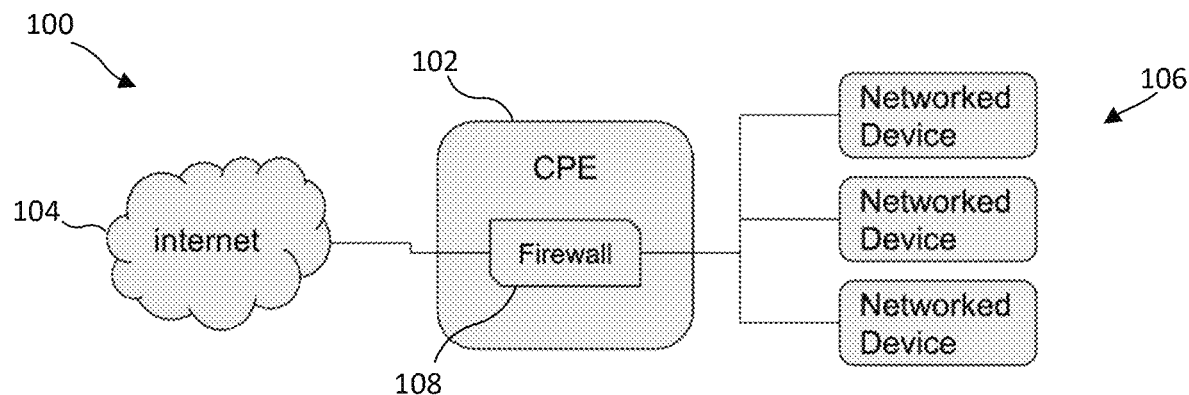
FIG. 1 is a diagram showing an example home network configuration according to the prior art.

A home network typically includes an internet connection device, such as a cable modem, fiber optic modem, cellular gateway, and one or more routers for routing and managing traffic between the home network and the internet. These devices are often combined into a single device, which is sometimes referred to as a consumer premise endpoint (CPE). A diagram showing an example home network configuration 100 is shown in FIG. 1. The home network configuration includes a CPE 102 (i.e., gateway and router) for routing traffic between the internet 104 and a home network 106 that includes a plurality of networked devices. The router/gateway is typically seen as the first line of defense in securing a network from attack. In general, routers/gateways typically implement security in the form of a filter or firewall 108 to prevent brute force attacks on the home network from known threats. Filters and firewalls primarily help against malicious traffic but are not very effective in protecting against malicious programs, such as malware and spyware. Filters and firewalls may also be bypassed using techniques like port redirection and IP spoofing. In addition, in recent years it has been shown that vulnerabilities in the firmware of routers and gateway devices can be exploited to gain access to the home network and in turn have complete access to all networked devices. Because consumers may be slow to upgrade firmware, filters, and other malware/antivirus protections, it is important to not rely solely on the router/gateway for home network security.

To improve home network security, many consumers attempt to adapt enterprise network security features to secure the network. For example, one method consumers have borrowed from enterprise networking is the use of virtual local area networks (VLAN) (802.1Q) to perform network segmentation. Network segmentation is a network security technique that divides a network into smaller, distinct sub-networks that enable network teams to compartmentalize the sub-networks and deliver unique security controls and services to each sub-network. In the home network context, VLANs are often used to attempt to segment the home network by isolating perceived vulnerable devices (e.g., an IoT wireless light switch) from more important devices, such as devices with high value assets (e.g., network attached storage (NAS)). However, in many cases, a consumer may not have adequate knowledge and/or training to successfully implement network segmentation. It is also possible that network vulnerability can be increased if the consumer believes that the network segmentation was implemented successfully when in fact it was not.

Figure 2:
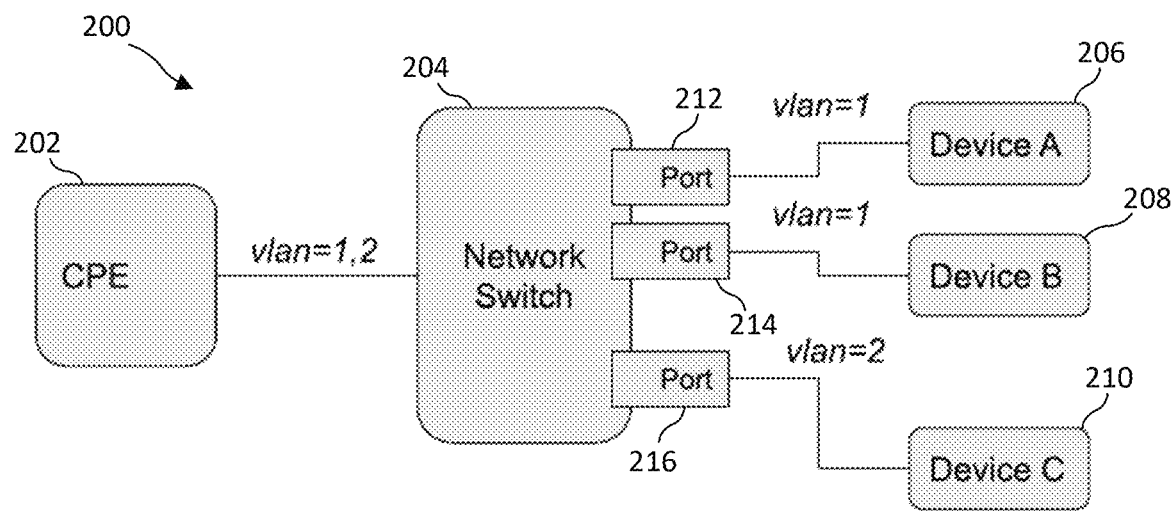
FIG. 2 is a diagram of an example home network configuration according to the prior art that utilizes virtual local area networks (VLANs) to segment the network.

To implement VLANs for network segmentation, network switches use a technique called VLAN tagging, which adds a VLAN identifier (ID) (i.e., tag) to each Ethernet frame to specify the VLAN to which device transmitting the frame belongs. This tag is used to route traffic to the correct VLAN. Only devices in the network having the same VLAN ID are allowed to communicate with each other. An example implementation of network segmentation for a home network 200 is shown in FIG. 2. The home network 200 includes a CPE 202, a network switch 204, and a plurality of networked devices 206, 208, 210. In this example, Device A 206 and Device B 208 are part of a first VLAN having a VLAN ID of 1. Device C 210 is part of a second VLAN having a VLAN ID of 2. Device A 206 is connected to a first port 212 on the network switch 204, and Device B 208 is connected to a second port 214 on the network switch. Device C 210 is connected to a third port 216 on the network switch. All traffic passing through port 212 from Device A 206 and passing through port 214 from Device B 208 is tagged with the VLAN ID 1, and all traffic passing through port 216 from Device C is tagged with the VLAN ID 2. In this example, because Device A 206 and Device B 208 are part of the same VLAN, Device A 206 and Device B 208 are allowed to communicate with each other but not with Device C which is part of a different VLAN. Device C can communicate with the network switch 204, the CPE 202, and the internet but is not allowed to communicate with Device A 206 or Device B 208.

A properly configured switch will not allow packets which are not suitably tagged to go to a port that requires that tag. For example, when the network switch 204 sees a packet intended for Device A 206 or Device B that is tagged with the VLAN ID 1 or a packet intended for Device C 210 that is tagged with the VLAN ID 2, the network switch routes the packet through the appropriate port to the intended destination. Packets intended for one of the devices that are not tagged with the correct VLAN are dropped. However, all traffic destined for the internet or gateway must be routed there whether it is tagged or not. As a result, there is still a reliance on the router/gateway device to filter between the VLANs. VLANs in enterprise networking are not typically utilized to provide any real protection. Their purpose in enterprise networking is to segment a network for maintenance and operations at the enterprise level. If configured correctly, it is possible to achieve isolation between ports on a switch and/or between devices. However, this isolation can be relatively easy for an attacker to overcome if any device (including a router/gateway) is connected where all traffic between VLANs can be monitored (e.g., snooped) to find further vulnerabilities.

Figure 3:
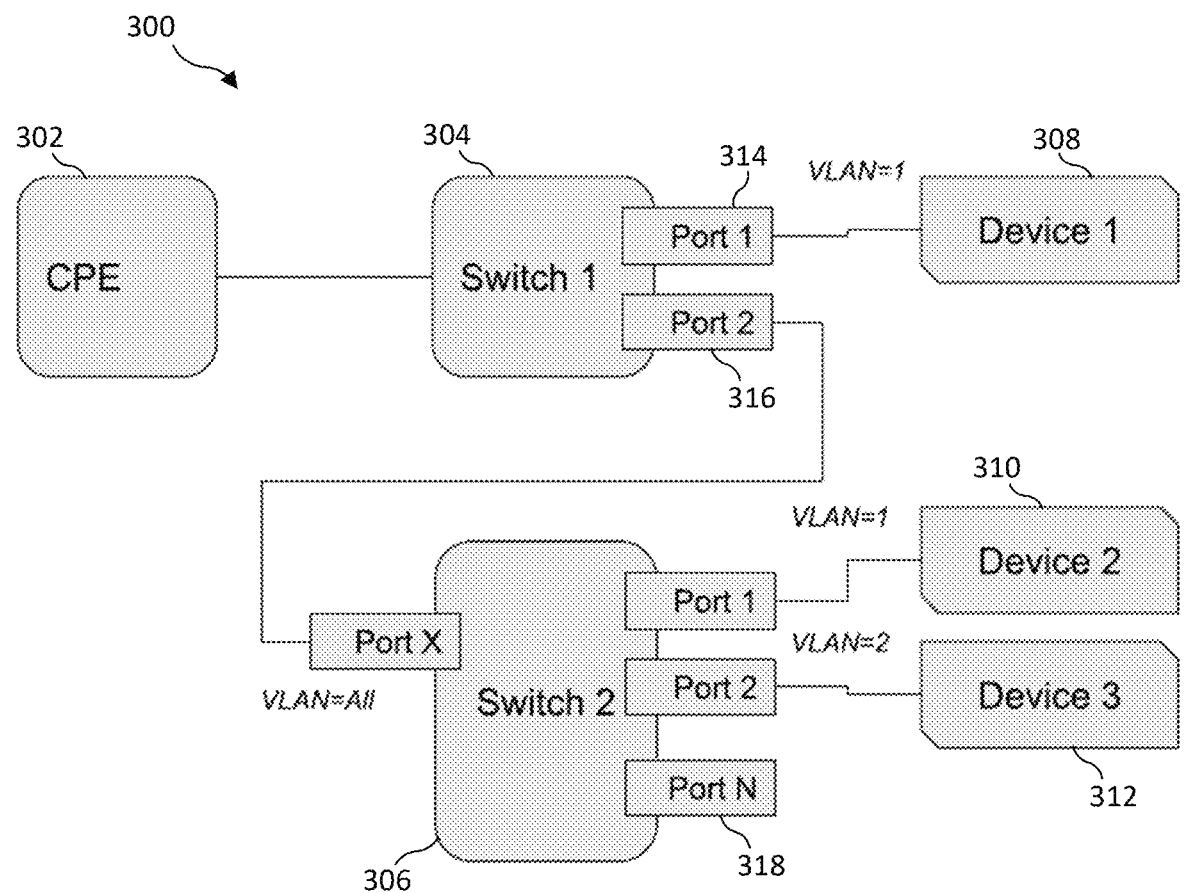
FIG. 3 is a diagram of an example home network configuration according to the prior art that utilizes virtual local area networks (VLANs) to segment the network and includes multiple network switches.

A typical example would be a network where the consumer adds a second level switch, such as a switch built into a Wi-Fi Access Point. An example of this scenario is shown in FIG. 3. The home network 300 of FIG. 3 includes a CPE 302, a first network switch 304 (i.e., Switch 1), and a second network switch 306 (i.e., Switch 2). Switch 306 is connected downstream from switch 304. Device 308 and Device 310 are assigned to a first VLAN having the VLAN ID 1. Device 312 is assigned to a second VLAN having the VLAN ID 2. In this case, device 308 is connected to switch 304, and device 310 and device 312 are each connected to switch 306. Generally, a switch allows a port to have a single VLAN or none (i.e., all traffic passes through the port). In the example of FIG. 3, port 314 of switch 304 is assigned to VLAN ID 1 while port 316 is unassigned. As a result, all network traffic to switch 304 passes through port 316 and is available to switch 306 to monitor and make routing decisions. Unused network switch ports therefore are a potential vulnerability as a rogue device inserted at one of these ports, such as port 318 of switch 306, can have access to all the data in the switch.

The use of VLANs can present other difficulties for consumers. For example, in some cases, devices which a consumer intended to communicate with each other can be assigned to different VLANs and become isolated from each other. This can happen, for instance, when a network video recorder (NVR) and an associated NAS are assigned to a first VLAN while video cameras are assigned to a second VLAN (e.g., for IoT devices). Best practice is to ensure that devices from the first VLAN and the second VLAN are isolated from each other. However, if the consumer wants the video cameras to communicate with the NVR, the consumer must implement a mitigation to provide communication across the VLANs which negates the reason for using the VLANs in the first place.

To address these technical problems and more, in an example, this description provides technical solutions for home network security in the form of a secured network switch, also referred to herein as a secured switch, configured to enforce security between devices on a home network to ensure vulnerable devices do not compromise assets on privileged devices. The secured switch operates primarily at Layer 2 (L2, i.e., data link layer) is configured to utilize a number of assets/features available within switches and routers today in combination with additional logic to make it easier and more efficient for administrators to manage those features. An important part of the secured switch is to change the idea of security of the network from the use of VLANs to the use of device management and enforcement. Thus, the secured switch will not explicitly provide for management of VLANs but will employ awareness which enables improved security for VLANs. For all intents and purposes, the secured switch behaves like a "dumb" switch in a VLAN network which means that it will forward VLAN tagged packets unmodified across its ports.

The core of the secured switch is a tuned L2 filter/firewall to isolate devices from each other with control of Network Neighbor Discovery within the network. A layer 2 filter refers to a filter operating at the data link layer of the Open Systems Interconnection (OSI) model, used to control or manage network traffic based on MAC addresses, VLAN tags, or other data link layer attributes. Device security will be achieved by applying specific mechanisms which complement each other within the network switch. Firstly, from power on, the secured switch will run an L2 filter across the switch. This will ensure only devices that have been classified to allow communication with each other by the network administrator can forward packets to each other. All other packets will be managed by the secured switch. By default, devices will be allowed to access a minimum set of features and/or have a default set of permissions which can be configured by an administrator, such as internet routing, Dynamic Host Configuration Protocol (DHCP), etc., in order to minimize the permitted traffic. In various implementations, the administrator will be able to customize the set of features/permissions allocated to each device and add additional customizations where possible. The secured switch will also gather device information by snooping various sources of device 'broadcast' information and present this information via a user interface to aid network administrators in classifying devices and creating device to device relationships.

With the filtering in place on the secured switch, the next step is to deploy broadcast, multicast and network neighbor management to control the device discovery through the switch. This will aid the user through the user interface by providing additional information on each device on the network, as explained in more detail below. This will also help to limit/throttle the superfluous traffic within the network thereby improving latency and overall performance. All network neighbor discovery, such as Address Resolution Protocol (ARP) on IPv4 and Neighbor Discovery Protocol (NDP) for IPV6, will be managed by the secured switch. All requests will be stopped at the secured switch with the secured switch taking ownership of the request to the rest of the network. On receiving a response, the secured switch will determine if the original requestor is permitted to see the device responding before forwarding, thus reducing the surface area of the network a rogue device gets to see. The secured switch will also include an advanced Internet Group Management Protocol (IGMP) and Multicast Listener Discovery (MLD) management that will snoop on multicast messaging and prevent flood of multicast streams by ensuring multicast packets are only forwarded on ports with actively registered clients, and not just simply flooding all ports with multicast packets, which is the default for most switches. This will ensure other devices continue to get time on the link where it is needed.

All the mechanisms are tied together with a device centric user interface spanning multiple secured switches which in turn provides the network administrator with fast and intuitive functions to extend privileges between devices as needed. An additional benefit of the secured switch is in quieting down superfluous traffic for network gaming devices, so they have a much better ability to get packets to where they need to be. When this feature is paired with quality of service (QOS) management, the secured switch is capable of ensuring packets from a known (through detection or registration) gaming device can be prioritized to upstream gateways or even local media devices for in home game streaming.

VLAN Handling

Figure 4:
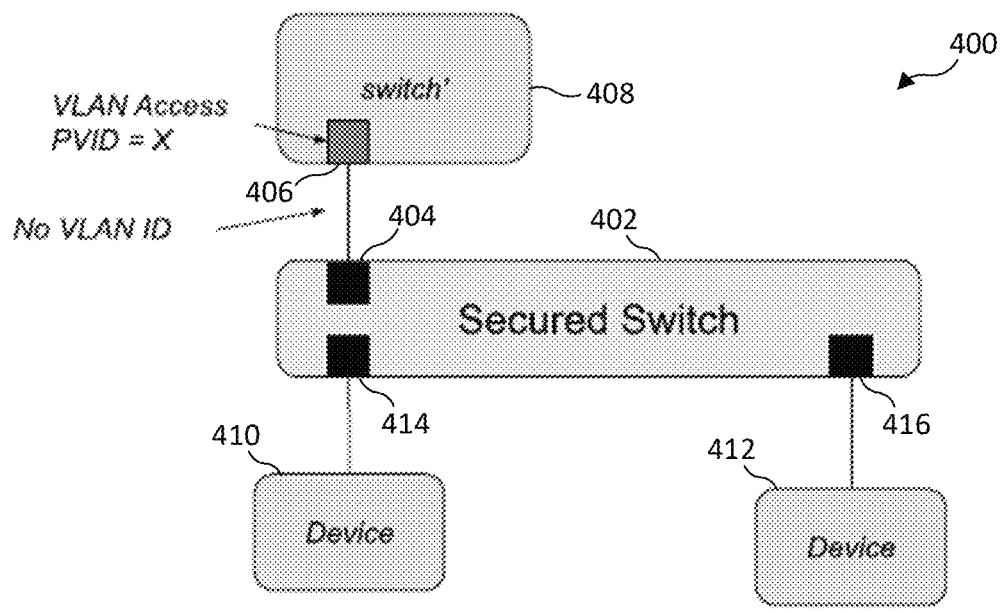
FIG. 4 shows an example network configuration including a secured switch that is connected to a network switch according to this disclosure.

The secured switch will not do any packet mangling for VLAN traffic attempting to traverse the switch. Packet mangling refers to the intentional (and not malicious) practice of altering packet header data for security purposes. In this case, the secured switch will not strip VLAN IDs or add VLAN IDs to data packets received or forwarded. If the secured switch is required to participate within a VLAN network, an administrator will assign a VLAN ID from a higher-level switch's access port. An access port (AP) on a switch generally refers to the port that is assigned a primary VLAN ID (PVID) to tag any incoming traffic from a device via the access port, and drop any traffic destined to the device that does not have the appropriate PVID. In the example network configuration 400 shown in FIG. 4, a secured switch 402 includes a port 404 which is connected to an access port 406 of a higher-level switch 408. In this case, the port 404 is assigned the PVID of the access port 406 of switch 408.

In a network that does not have a secured switch, administrators would normally be required to assign different PVIDs to ports to which devices are connected in order to isolate the devices from each other. For example, in FIG. 4, if the switch 402 was a non-secured switch, port 414 would be assigned a first PVID and port 416 would be assigned a second PVID in order to isolate devices connected to the port 414, such as device 410, from devices connected to the port 416, such as device 412. However, because switch 402 is a secured switch in accordance with this disclosure, isolation is not required because the secured switch 402 automatically isolates devices on the same switch (and across secured switches) from each other unless explicitly instructed otherwise by an administrator through the creation of relationships.

Figure 5:
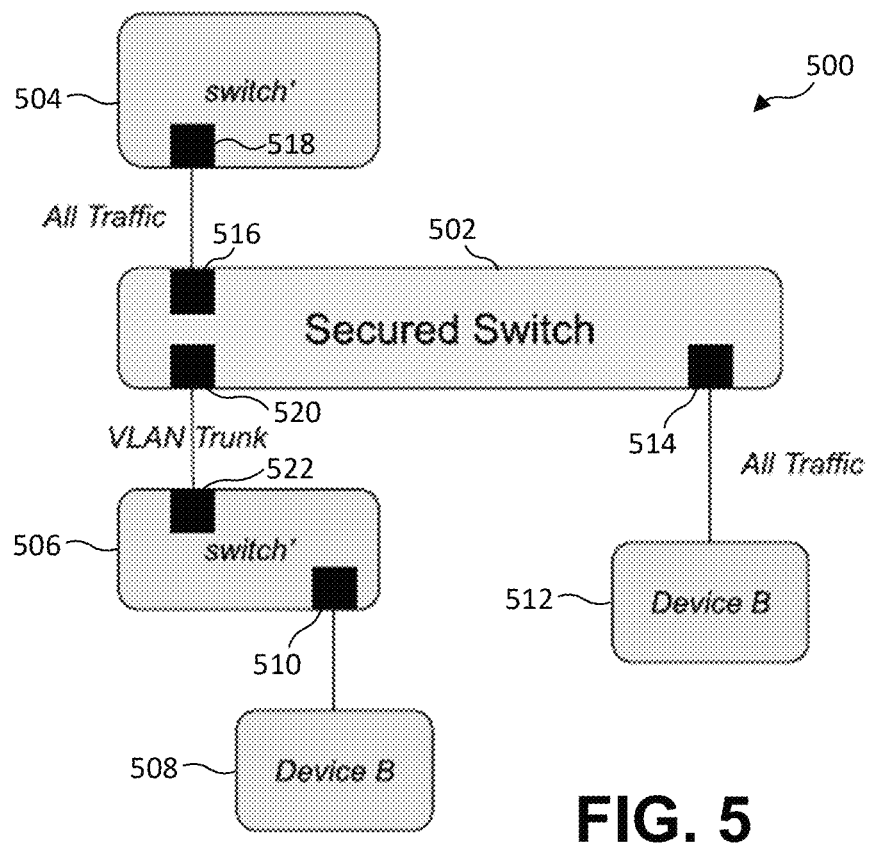
FIG. 5 shows an example network configuration including a secured switch that is connected between two network switches according to this disclosure.

In the situation where a secured switch is connected between two non-secured switches supporting VLAN, the secured switch continues to forward traffic while ensuring isolation of devices across the network. An example of this scenario is shown in FIG. 5. The example network configuration 500 of FIG. 5 includes a secured switch 502, a first switch 504 connected upstream from the secured switch 502, and a second switch 506 connected downstream from the secured switch 502. A first device 508 is connected to the port 510 of the second switch 506, and a second device 512 is connected to the port 514 of the secured switch 502. The secured switch 502 includes a port 516 which is connected to the port 518 of the first switch 504 and a port 520 which is connected to the port 522 of the second switch 506. In the example of FIG. 5, device 508 and device 512, because they are connected to different ports of the secured switch 502, are isolated from each other at all times unless an administrator explicitly creates a relationship in the secured switch for the devices.

L2 Filter/Firewall

Figure 6:
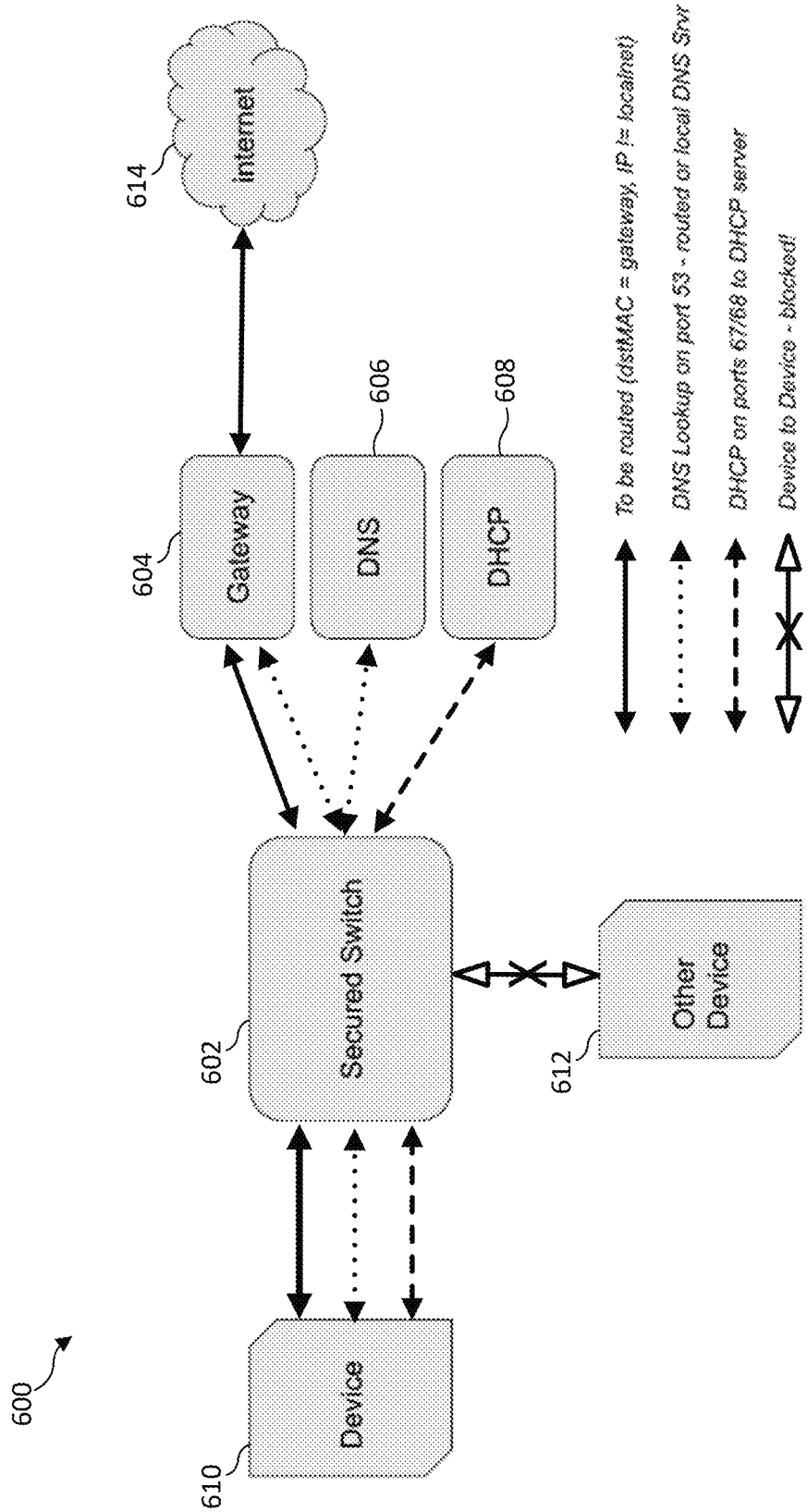
FIG. 6 shows an example of how a secured switch, such as the secured switch of FIGS. 4 and 5, handles device traffic when device to device communication is not permitted.

As mentioned previously, central to the secured switch is an L2 filter. This filter (also referred to as a firewall) is used to control which devices can communicate with each other within the network and from outside the network. By default, the secured switch minimizes the traffic permitted between devices. In various implementations, the default permissions are customizable via the user interface of the switch (explained in more detail below). The L2 filter may initially be configured during an initial boot to have default permissions which allow minimal connectivity, e.g., such as enabling a newly connected device to connect to the internet. In a typical home consumer environment, the gateway, Domain Name System (DNS) server, and DHCP server are included in a single device provided by the Internet Service Provider (ISP). An example of this scenario is shown in FIG. 6. The network configuration 600 of FIG. 6 includes a secured switch 602, a gateway 604, a DNS server 606, and a DHCP server 608. In various implementations, the gateway 604, DNS server 606, and DHCP server 608 are provided in a single device. In this example, a first device 610 and a second device 612 are connected to the secured switch 602. The initial configuration of the first device 610 and second device 612 enables these devices to connect to the internet 614 via gateway 604 and to the DNS server 606 and DHCP server 608. In FIG. 6, device 610 is shown communicating in this manner. The initial configuration of the first device 610 and second device 612 also prevents device to device communication. This is shown by the blocked communication from the second device 612 which is intended for the first device 610. The network administrator may have the option to further reduce or refine the permissions (e.g., substitute a list of DHCP servers instead of using the default gateway).

Thus, by default, on adding a new device to the network, the device will have sufficient access to connect to the network successfully and reach the internet (unless default permissions have been modified by the administrator). This will enable a device to be up and running with minimal delay. The newly added device will not be allowed to communicate with other devices or services through the secured switch, thus ensuring the integrity of the network and its assets. On connecting to the network, the network administrator may get a notification via the user interface that a new device was added so that further action can be taken, such as permitting additional access or banning the device if it is not recognized.

To complement the filter/firewall and to add supplemental information for the administrator to take into consideration in adding a device, the secured switch deploys some sniffers for common services on the network in order to acquire additional information about a device. For example, the secured switch may be configured to listen on DHCP, multicast DNS (mDNS), ARP, IGMP, and IPv6 NDP messages to gather additional data associated with the Media Access Control (MAC) address of the connected device. This coupled with Organizationally Unique Identifier (OUI) information from the MAC address provides additional information which can be presented to an administrator via the user interface to help guide the administrator through available options for the device.

Within the user interface, the administrator can ban a device from the network, mark it as known, and/or create relationships to other devices and services recognized in the network. The secure switch may include a classification and connection component which can facilitate classification of devices according to one or more predefined categories, such as printer, gaming console, and the like. For example, on detecting a new device with a MAC address OUI matching a well-known printer manufacturer and advertising printing services via mDNS, the classification and connection component can help the administrator to identify the printer and create a device-to-device relationship between those devices in order to allow packets from the device to the printer to be permitted through the secured switch. An example of this scenario is shown in FIG. 7.

Figure 7:
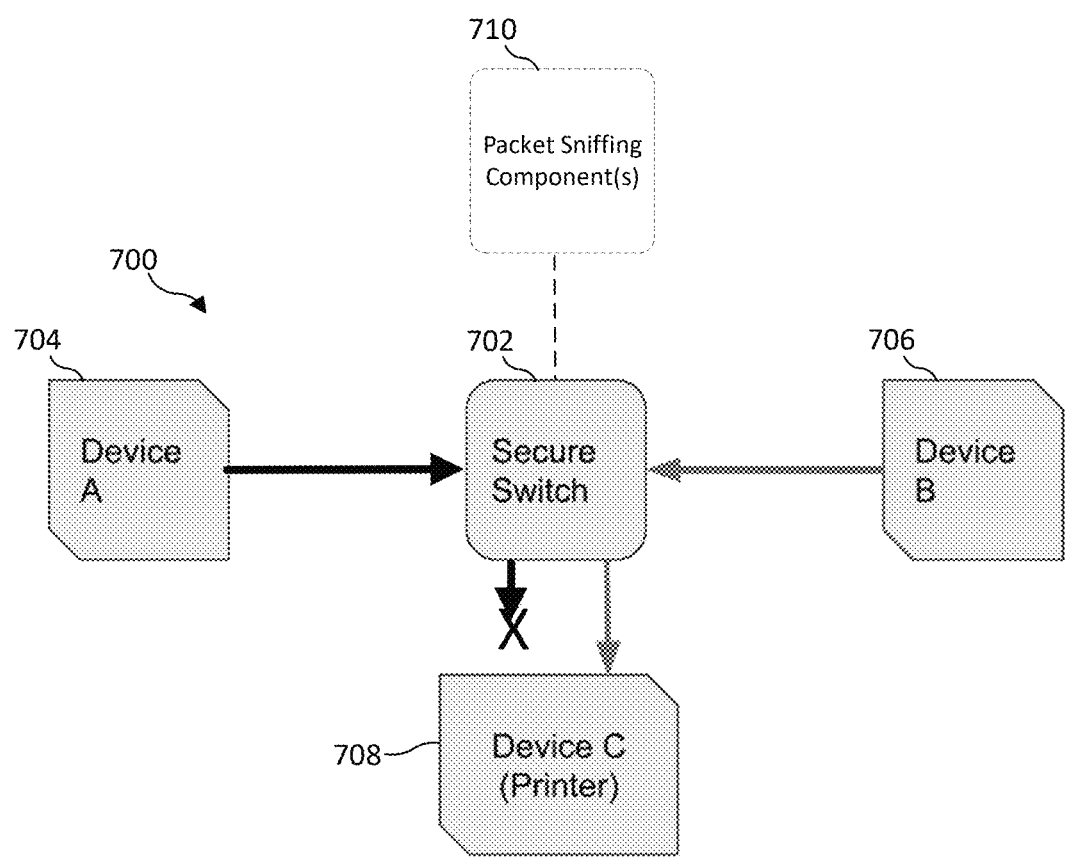
FIG. 7 shows an example of how a secured switch handles communication between a device having a defined relationship with a printing device on the network and a device that does not have a defined relationship with the printing device.

In the example network configuration 700 of FIG. 7, a secure switch 702 is connected to a first device 704, a second device 706, and a third device 708. When the third device 708 is connected to the network, packet sniffing component(s) 710 can facilitate classification of the device by collecting classification information, such as MAC address OUIs in DHCP messages and service advertisements in mDNS messages, which the secured switch can process to identify suggested classifications for new devices. These suggested classifications can be presented to an administrator via a user interface to provide easy options for classifying new devices. In this example, the secured switch 702 determines the device 708 is likely a printer because the MAC address OUI of the device 708 indicates that the device was manufactured by a well-known printer manufacturer and because the device is advertising printing services via mDNS. The secured switch 702 can indicate via the user interface of the secured switch 702 that device 708 is likely a printer to aid an administrator in classifying the device and setting permissions for the device. The secured switch 702 can also indicate via the user interface that relationships/connections between the printing device 708 and other devices which are likely to access the printing services of the printing device 708 can be registered in the switch to enable these devices to access the printing services provided by the printing device 708. In the example of FIG. 7, the administrator has enabled the second device 706 to use the printing service of device 708. Thus, the secure switch 702 permits packets from device 706 to device 708. However, the administrator has not enabled the first device 704 to access the printing services of device 708. Therefore, any attempt by the first device 704 to forward packets to the printing device 708 is blocked by the secure switch 702.

Figure 8:
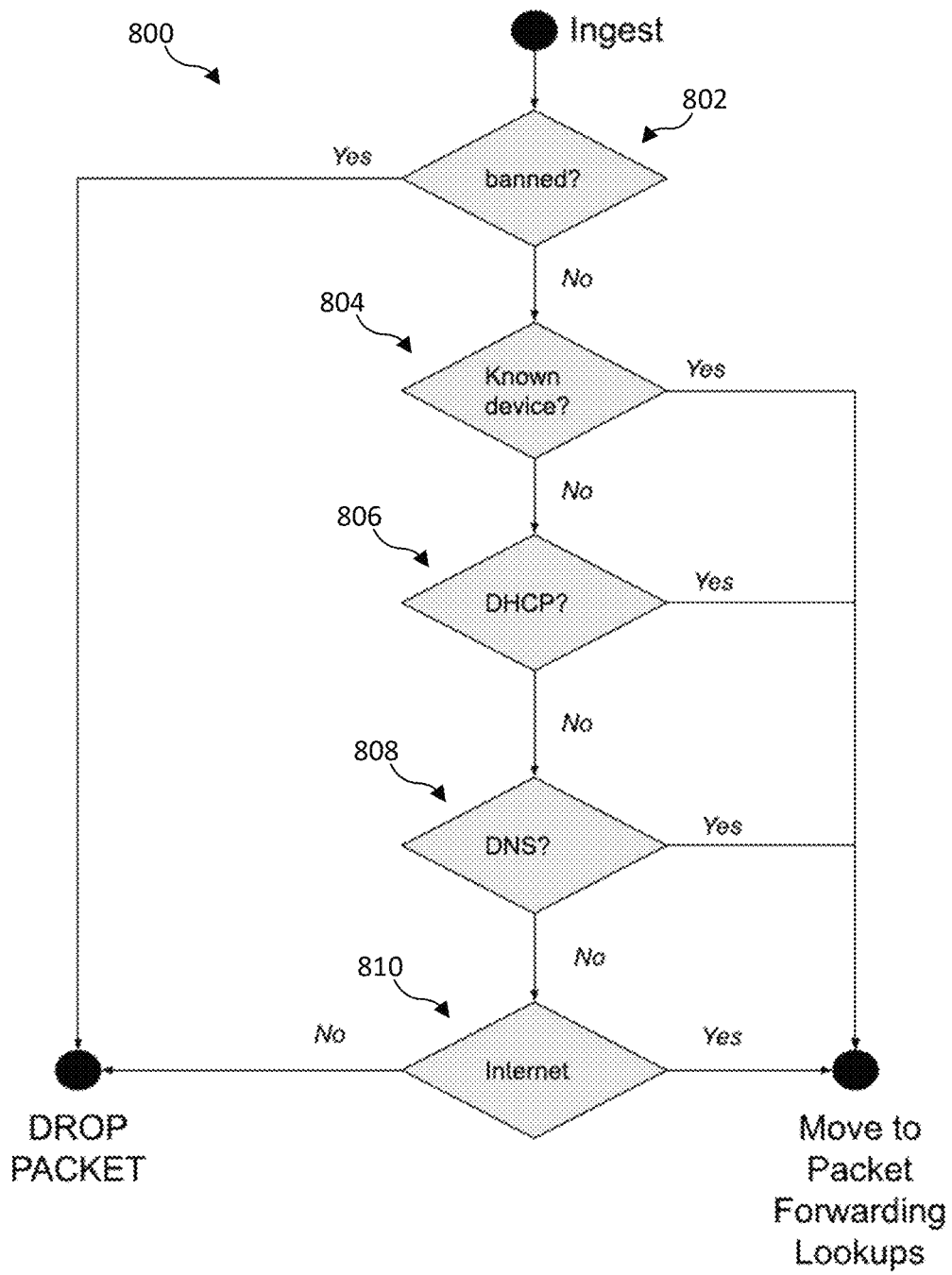
FIG. 8 is a flowchart for an example filtering process for a first stage filter implemented by a secured switch.

To enable the secure switch to achieve selective device connections, the secure switch may be configured to employ multiple stages of filtering. An example flowchart for multistage filtering method 800 is shown in FIG. 8. The first stage is at the ingress ports of the switch. The secured switch checks whether the source device is on a list of banned devices (block 802). If so, the packets are dropped immediately to prevent the packets from entering the switch logic and consuming valuable resources that could otherwise be used by other devices and events. If the source device passes the 'banned' test, the switch checks to see if the device is a known device (block 804), i.e., the administrator has indicated it is a valid device for the network and not just subject to the default rules, and/or if additional permissions are to be granted to the device. If the device is known, its packets are permitted to be added to the switching algorithms for further processing. If the source device is 'unknown', i.e., the administrator has not indicated that the device is banned, or known and part of a group, then the device's packets are subject to the default ruleset, e.g., DHCP (block 806), DNS (block 808), Internet (block 810). If the source device does pass any of the tests, the packets are added to the switching algorithms for further processing. Should the source device not pass any of these tests, then the packets are dropped.

Figure 9:
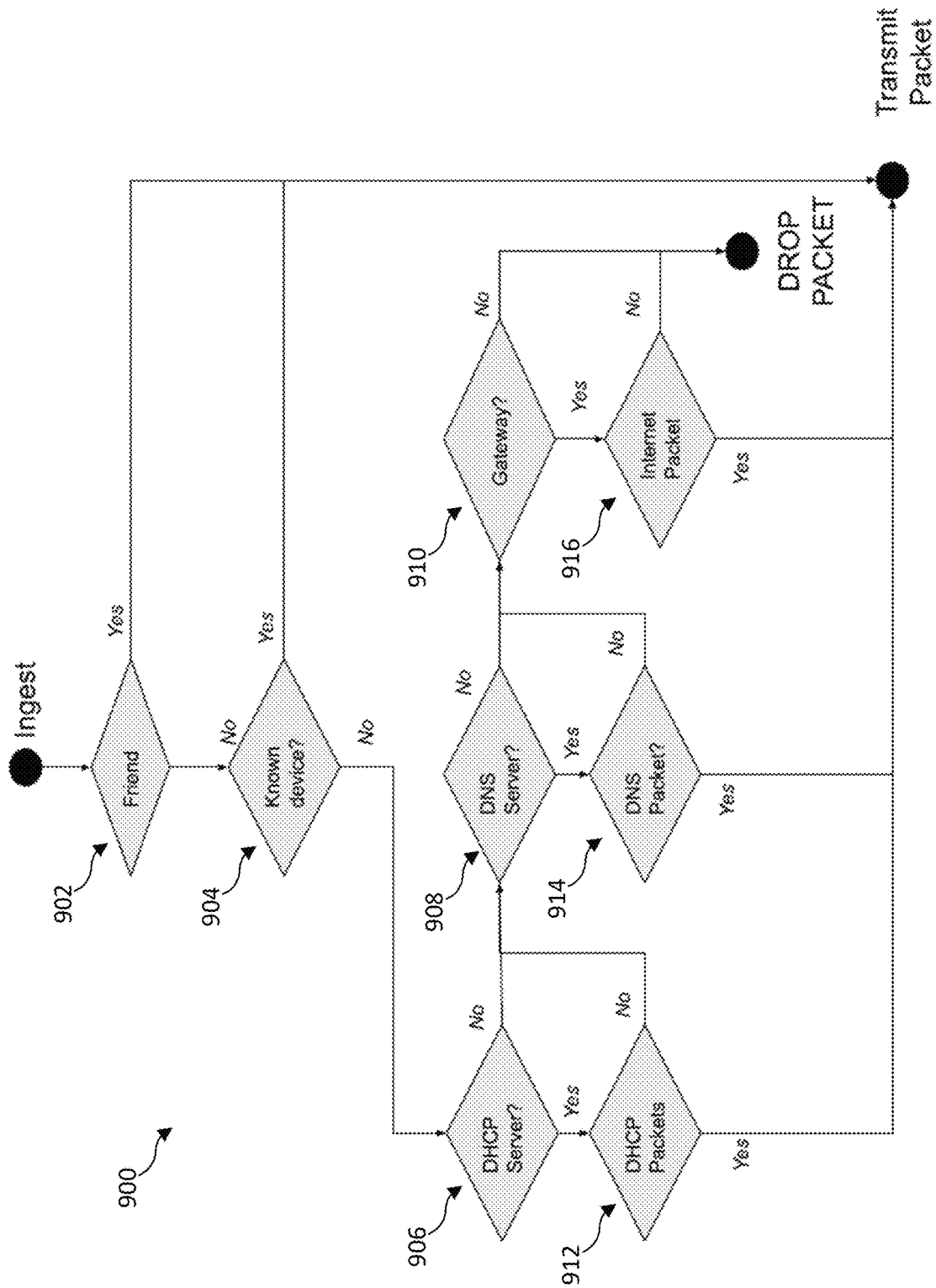
FIG. 9 shows a flowchart for an example filtering process for a last stage filter implemented by a secured switch.

The final stage of filtering occurs after the switch algorithms determine the output ports for the packet. For example, when the packet targets a particular MAC address and the switch knows the MAC address is associated with a particular port, the output port for the packet is that port. At this stage, the secured switch checks if there is a defined relationship between the target and the source devices. An example flowchart 900 of a method for determining whether there is a defined relationship between target and source devices is shown in FIG. 9. The secured switch checks to see if the target and source devices are friends, i.e., have a connection/relationship registered in the system (block 902).

If they do, the packet may be transmitted via the determined output port for the packet. If they do not, the secured switch checks to see if the target device is a known device, i.e., the administrator has indicated it is a valid device for the network and not just subject to the default rules, and/or if additional permissions are to be granted to the device (block 904). If the target device is a known device, the packet may be transmitted via the determined output port for the packet. In some implementations, if an unknown device matches a rule within the default ruleset that permits transmission of the packet, the packet will be allowed to be forwarded to the devices indicated by that ruleset.

Any packets targeting the switch itself will be checked to make sure the source device is on a list of permitted administration devices, such as a DHCP server (block 906), a DNS server (block 908), and a gateway (block 910). The packet will also be checked to see if it is an administrative packet, e.g., a DHCP packet (Block 912), a DNS packet (block 914), or an Internet packet (block 916). If the packet is from a DHCP server and is a DHCP packet, the packet may be transmitted via the determined output port for the packet. Similarly, if the packet is from a DNS server and is a DNS packet or if the packet is from the gateway and is an internet packet, the packet is transmitted via the determined output port for the packet. If the source device is on the list of permitted administration devices, the device will only be allowed to access the management ports which have been defined for the switch. By default, the list of administration devices is not locked down so all administration devices on the switch will be able to access the devices' management ports. An administrator may be allowed to lockdown specific devices via the user interface of the switch.

Broadcast Management

Figure 10:
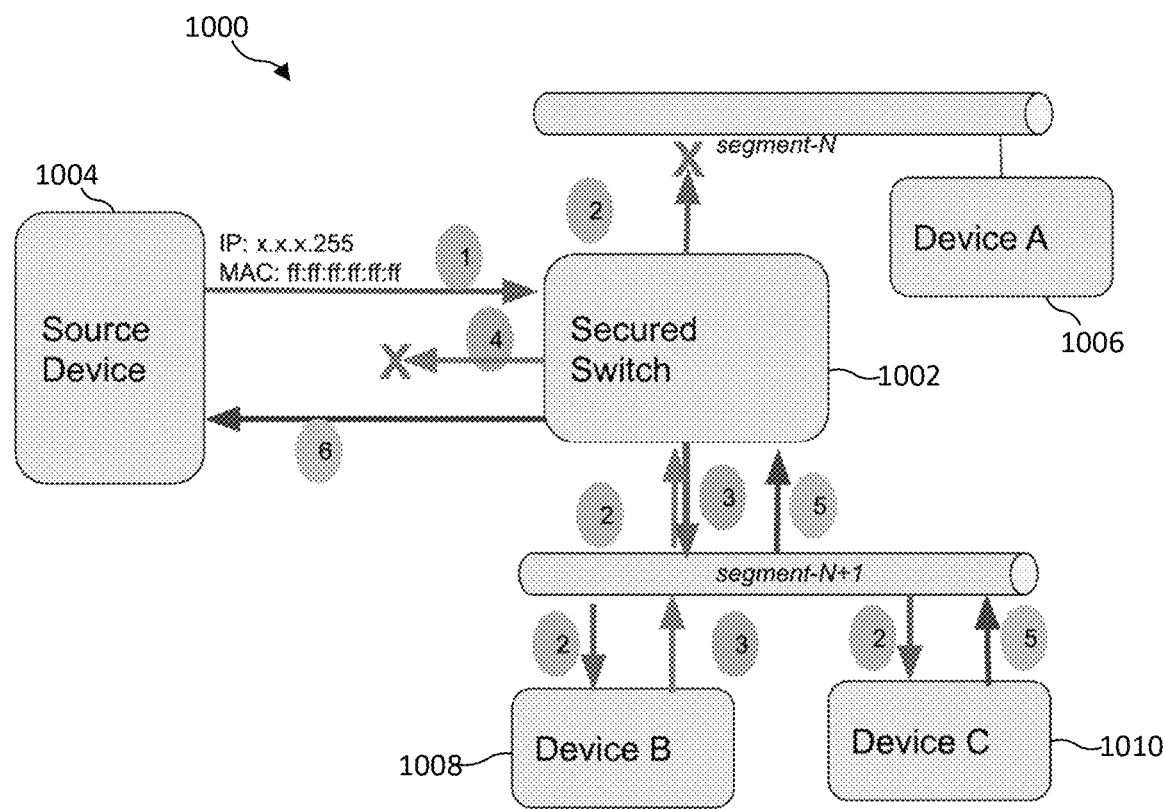
FIG. 10 shows an example of how broadcast messages are handled by a secured switch according to this disclosure.

A typical broadcast flow is to broadcast an announcement and then use unicast (to specific "uni" devices) or multicast for communications. In a network with a secured switch, the secured switch will see the broadcast packet and then determine if there are any related devices connected to any network segments attached to its ports. Should a related device exist on a port connection, the secured switch will permit the broadcast through the switch. Otherwise, the broadcast will be dropped within the switch. If the source device is banned, the broadcast packet is dropped before hitting the switching logic. In this case, because the broadcast packet does not enter the switch, switch resources will not have to be used to process the packet.

Where multiple devices exist on a network segment, such as when the last transition of networking from the secure switch to the target device contains multiple devices, and the secure switch determines that transmission of a broadcast packet on to that segment is to be permitted, there is no method to prevent other devices from seeing the packet. However, the typical flow will be for devices to respond with a unicast packet to the broadcaster. In this case, if there is no relationship defined in the secure switch between the source of the unicast packet and the broadcaster, the response packets will be dropped. Only responses from devices related to the broadcaster will be permitted to pass through the switch to the broadcaster. An example network configuration 1000 showing this scenario is shown in FIG. 10. The network configuration 1000 of FIG. 10 includes a secured switch 1002 and a source device 1004. The secured switch 1002 has a network segment N connected to one port and a network segment N+1 connected to another port. A first device 1006 is connected to network segment N. A second device 1008 and a third device 1010 are connected to network segment N+1. In this example, neither the first device 1006 nor the second device 1008 has a relationship defined with the source device 1004. Only the third device 1010 has a relationship defined with the source device 1004. When the source device 1004 initiates a broadcast message (1) to the secured switch 1002, the secured switch prevents the broadcast message (2) from being transmitted to network segment N because there is no relationship defined between the source device 1004 and the first device 1006, so the first device 1006 never sees the message. The secured switch 1002 does transmit the broadcast message (2) to network segment N+1 because the third device 1010 is connected to that segment. The third device 1010 transmits a response (5) to secured switch 1002 which forwards the response (6) to the source device 1004. The second device 1008 also receives the broadcast packet (2) even though there is no relationship defined between the source device 1004 and the second device 1008. The second device 1008 also transmits a response (3) to the secured switch 1002. However, when the secured switch 1002 sees that there is no relationship between the second device 1008 and the source device 1004, the secured switch 1002 drops the response (4).

Neighbor Management

Figure 11:
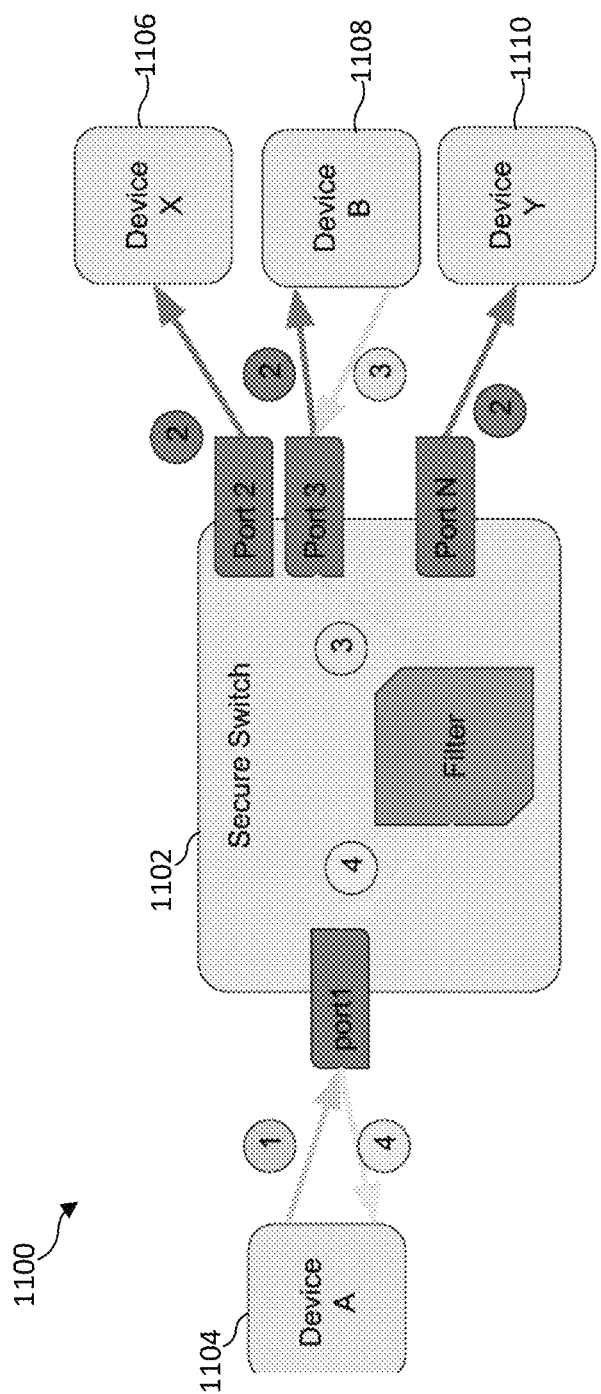
FIG. 11 shows an example of how broadcast messages are handled by a secured switch for IPV4 and IPV6.

For IPV4 and IPv6, neighbor management is performed differently than for unsecured switches. IPv4 uses ARP which is a broadcast packet on the local network to a target IP address (e.g., to IP: 255.255.255.255 with a target MAC of ff:ff:ff:ff:ff:ff). The device with that IP address responds with its MAC address which establishes a connection between the initiating device and the target device so the initiating device can send packets to it. However, the secured switch is configured to prevent devices from finding more devices than necessary. An example showing this scenario is shown in FIG. 11. The network configuration 1100 of FIG. 11 includes a secured switch 1102, an initiating device 1104, a target device 1106, a second target device 1108, and a third target device (1110). The initiating device 1104 transmits an ARP request broadcast (1) which is received by the secured switch 1102. When the switch 1102 receives the ARP request broadcast (1), it will terminate the flow locally, then initiate an ARP request (2) for the same target IP address on its other ports. On receiving a response (3) from the second target device 1108, the secure switch determines whether the initiating device 1104 is permitted to see the second target device 1108. When the initiating device 1104 is permitted to see the second target device 1108, the switch 1102 sends a response (4) to the initiating device 1104 as if it came from the second target device 1108. The response establishes the connection between the initiating device 1104 and the second target device 1108 so the initiating device 1104 can communicate with the second target device 1108. By performing this management, the secured switch 1102 prevents topology/device discovery beyond the switch. This also enables the switch to create a more detailed map of devices within the network which can be displayed via the user interface.

IPv6 has NDP which is similar to ARP. However, rather than using broadcast IP, NDP uses a number of Internet Control Message Protocol v6 (ICMPv6) messages and multicast addressing to advertise and solicit neighbor information. The secured switch intercepts the ICMPv6 neighbor solicitation message which is encapsulated in an IPV6 frame with a destination address set to a multicast group (e.g., FF02::1:FFxx:xxxx where xx:xxxx are the last 6 hexadecimal values of the IPV6 address that the initiating device is looking for). Then, further encapsulated in an ethernet frame, the destination MAC address is set to 33:33:yy:yy:yy:yy where yy:yy:yy:yy represent the last 8 digits of the IPV6 address (i.e. FFxx:xxxx). The secured switch may then create its own neighbor solicitation message substituting its MAC and IPV6 source addresses and awaits a response. On receiving the response from the intended target, the secured switch determines, based on the device configuration, if communication is permitted between the two devices. If communication is permitted, a response (e.g., a neighbor advertisement message) is sent to the initiating device as if it came from the target device.

In a network in which VLANs are used, the Neighbor Management proxies of the secured switch require additional handling with respect to any traffic tagged with a valid VLAN ID. On receiving a neighbor lookup request, the secured switch ensures that the forwarded request and the response reflects the VLAN associated with the requestor. If a response to an IP lookup results in a packet that has a different VLAN ID from the VLAN associated with the requestor, a response will not be issued to the requestor. A response will only be issued to requestors that have a matching VLAN ID.

Multicast Management

Multicast exists for both IPv4 and IPV6 which enables a single device to broadcast data to a group of subscribed devices without having to know about those subscribed devices. Devices request to join a group through IGMP (IPv4) or MLD (IPv6) messaging. For both IPv4 and IPV6, a set of IP address ranges are reserved for creation of the multicast messages. Within those ranges, there are sets of default groups corresponding to predetermined message groups, such as network configuration, and the like.

Figure 12:
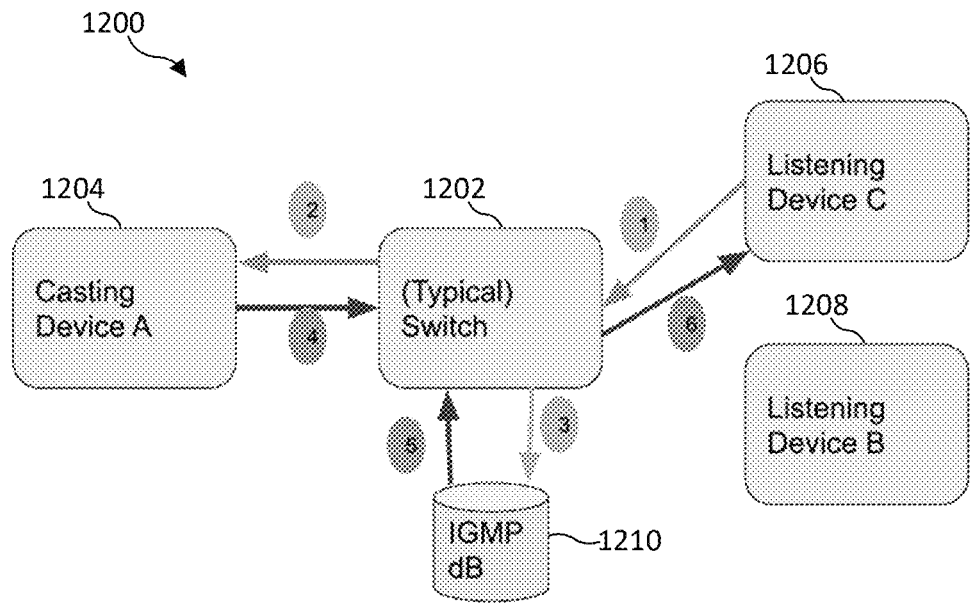
FIG. 12 shows an example of how multicast messages were handled in a computer network according to the prior art.

One downside of multicast for a switch is that there is nothing within the packet to identify the device that is listening for a multicast message. Thus, a switch must take that multicast packet and push it out of every other port of the switch just in case a device is listening for it. This default behavior can result in flooding of the network from multicast broadcasters as the switch pushes data down ports that have no listeners. To cope with the flooding, many advanced switches utilize a mechanism called IGMP or MLD snooping to listen for devices subscribing to multicast groups. An example of this scenario is shown in FIG. 12. The network configuration 1200 of FIG. 12 includes a typical (non-secured) switch 1202, a multicast device 1204, two listening devices 1206, 1208, and an IGMP database 1210. The switch 1202 utilizes IGMP snooping to listen for devices subscribing to multicast groups, which in this case include the listening devices 1206, 1208. This information is stored in the IGMP database 1210. When the multicast device 1204 transmits a broadcast message (4), the message is received by the switch 1202 which accesses the IGMP database 1210 to identify the address of a subscribed group, which in this case includes the listening device 1206. The switch then only forwards the broadcast packet (6) to the port associated with the subscribed device. When the response (1) is received by the switch 1202 from the listening device 1206, the IGMP database 1210 is used to identify the address of the casting device, and the switch 1202 forwards the response to the port associated with the identified casting device.

Figure 13:
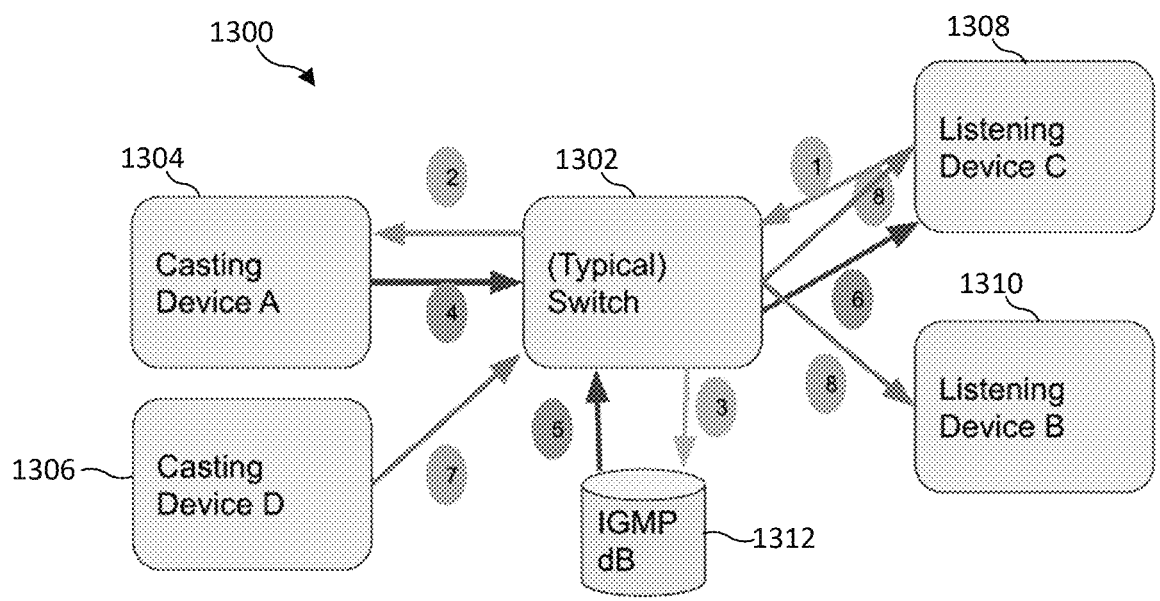
FIG. 13 shows another example of how multicast messages were handled in a computer network according to the prior art.

There remains a question of what to do with multicast messages when no connected device has initiated a subscription request. The default in many switches is to perform as if no snooping has occurred and thus flood the ports by forwarding the packets just in case. For example, referring to FIG. 13, a network configuration 1300 includes a typical (non-secured) switch 1302, two casting devices 1304, 1306, two listening devices 1308, 1310, and an IGMP database 1312. In the example of FIG. 13, the casting device 1304 and the casting device 1306 each transmit a broadcast message to the switch 1302. The switch then floods the ports by forwarding both broadcast messages to each output port which results in each listening device 1308, 1310 receiving the broadcast messages from both casting devices 1304, 1306. In this case, the listening device 1308 is subscribed to the multicast from casting device 1304. The listening device 1308 transmits a response to the switch 1302 which is forwarded to the port associated with the casting device 1304. The multicast from the casting device 1306 has no subscribers so there is no response for the casting device 1306.

Figure 14:
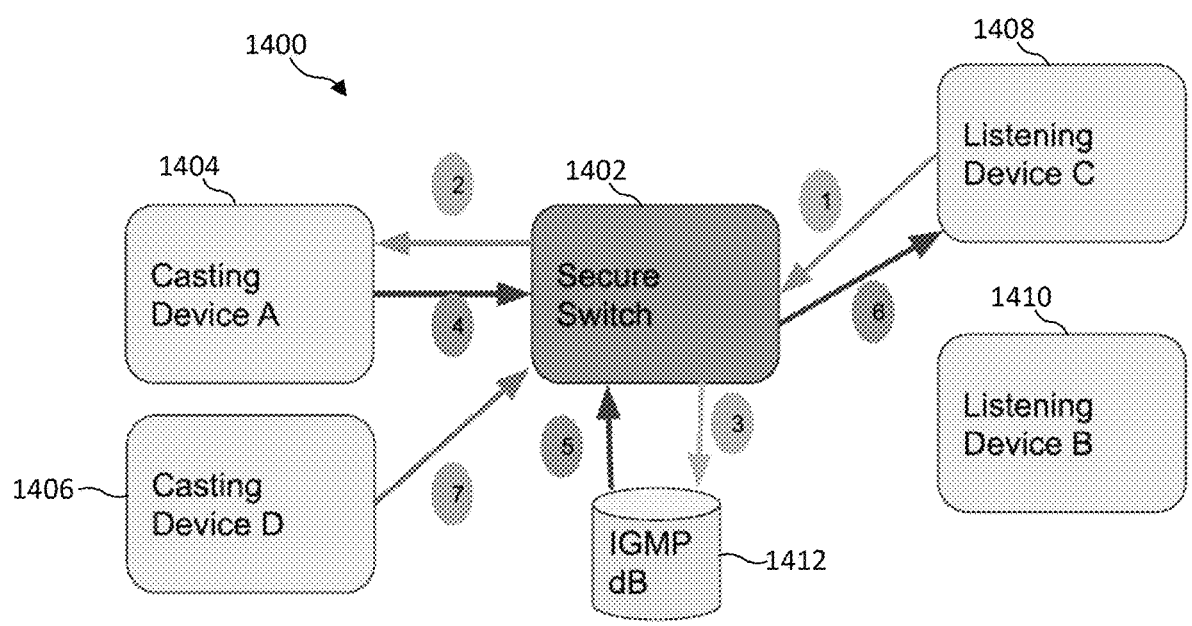
FIG. 14 shows an example of how a secured switch according to this disclosure handles multicast messages.

A goal of the secured switch is to prevent communication between devices unless there is an explicit relationship created to allow such communication. Thus, the secured switch is configured to always drop multicast messages on receipt unless there is a subscribed device. If there is a subscribed device, the secured switch will forward the packet to the port associated with the subscribed device. FIG. 14 shows an example network configuration 1400 that is similar to the network configuration of FIG. 13. In this case, the switch 1402 is a secured switch. Two casting devices 1404, 1406 transmit broadcast messages which are received by the secured switch 1402. The secured switch 1402 used the IGMP database 1412 to identify subscribers to the multicasts. In this case, the secured switch 1402 determines that the listening device 1408 is subscribed to the multicast from casting device 1404 and forwards the broadcast to the port associated with the listening device 1408. The secured switch 1402 also determines that there are no subscribers associated with the multicast from listening device 1406 so the multicast from listening device 1406 is dropped. Listening device 1410 is not subscribed to the multicast from either casting device 1404, 1406 so it does not receive any broadcast message.

In some implementations, a secured switch may be connected to another secured switch. In this case, if the port associated with a subscribed device is connected to the second secured switch, the second secured switch performs the next level of granularity until the multicast packet is forwarded only to subscribed devices. In some implementations, the secured switch, via the user interface, may enable the administrator to force a device into a group even if the device is misbehaving and not subscribing.

Wi-Fi Broadcast and Multicast Considerations

In addition to the previous multicast processing, the secured switch, when utilized within a Wi-Fi Access Point, may perform one more additional transformation to the data. In a typical access point, a broadcast packet is detected and sent as a Wi-Fi multicast frame. Unfortunately, the downside of a Wi-Fi multicast is that Wi-Fi speeds may have to be reduced to accommodate the least common denominator on the Wi-Fi band, which is typically the slowest Wi-Fi signaling rate, e.g., 1 Mbps for 2.4 Ghz and 6 Mbps for 5 GHz/6 Ghz. Note that 1 Mbps for 2.4 GHz represents 100% of the usable frequency/airtime until the multicast ends. Thus, preventing anything else from getting airtime. For 802.11n in 5 GHz and 802.11ac and 802.11ax, this was reduced to ⅙th of the spectrum to prevent such things from happening. However, it still drops the overall speed of the network.

Typically, access points in the market do not do anything special with respect to broadcast or multicast, other than have the same IGMP snooping in their L2 switching logic to ensure multicast is sent to devices wanting it. For example, if the device is on 5 GHz radio, multicast is only sent there and not on the 2.4 Ghz radio. However, for non-secured switches, the issue of port flooding can occur if no devices are subscribed to multicast but multicast is arriving at the AP.

Figure 15:
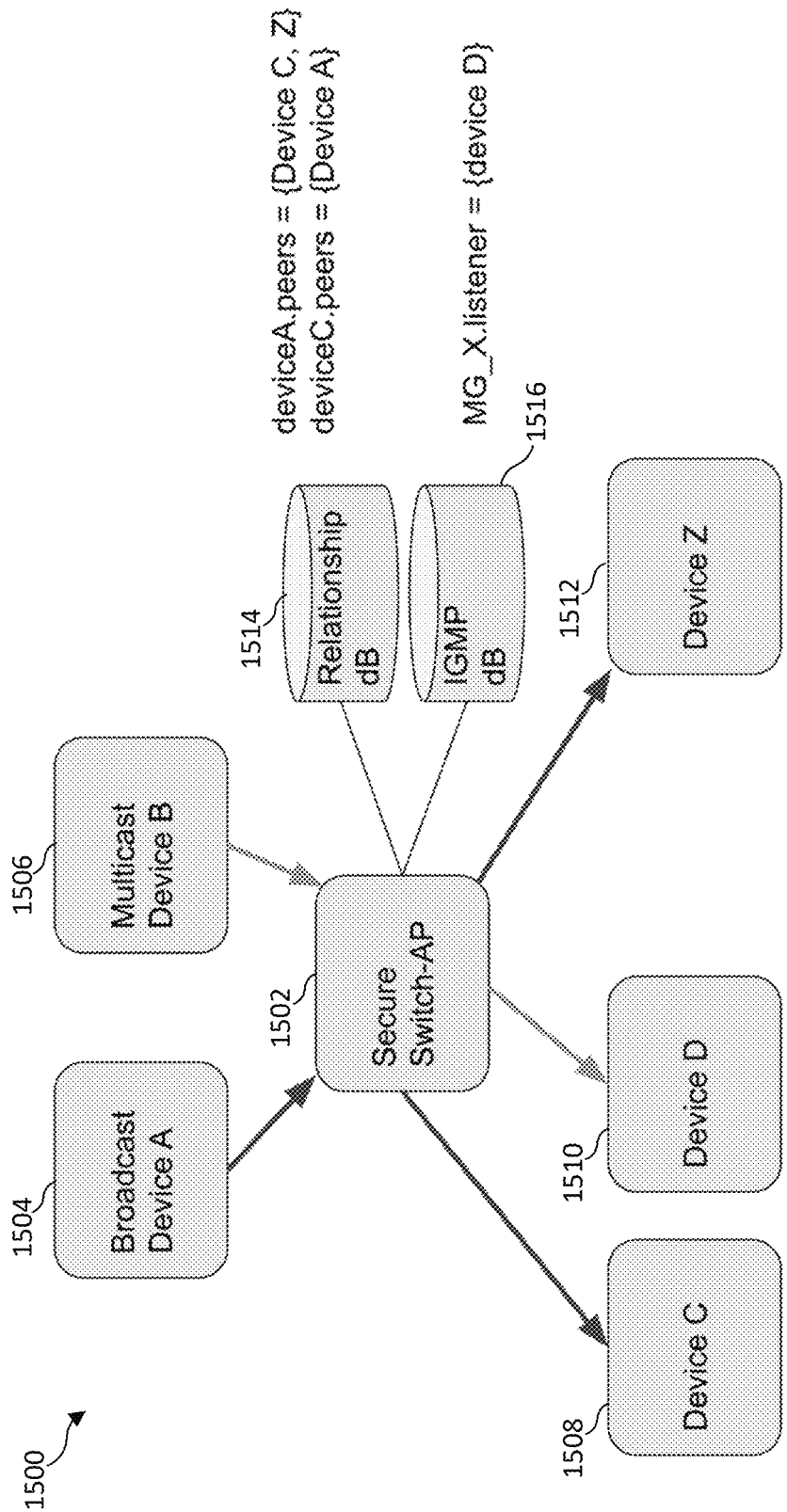
FIG. 15 shows an example of how a secured switch according to this disclosure handles Wi-Fi multicast messages.

For the secured switch, a different strategy may be deployed. This strategy will now be explained with reference to FIG. 15, which shows an example network configuration 1500 including a secured switch (Wi-Fi) access point (AP) 1502, a broadcast device 1504, a multicast device 1506, listening devices 1508, 1510, 1512, a relationship database 1514, and an IGMP database 1516. For a broadcast packet from broadcast device 1504 to all other wireless devices on the secured switch AP 1502, the secured switch AP 1502 will only allow devices which are peers of the broadcast device 1504 to receive the broadcast and will change the broadcast packet to a unicast packet to the peer devices. Broadcast device 1504 broadcasts to the secure switch AP 1502 which then converts the broadcast to two separate unicast packets which are sent to device 1508 and device 1512, respectively. Devices 1508 and 1512 are known to be Wi-Fi devices connected to the secured switch AP 1502. The device 1510 does not receive the broadcast since it has no peer relationship to the broadcast device 1504. For multicast device 1506, if no devices are subscribed, the secured switch AP 1502 will drop the multicast. However, when a device is subscribed, such as device 1510, the secured switch AP 1502 will convert the multicast to a unicast packet which is sent to device 1510.

Device Snooping

The secured switch will deploy several mechanisms to snoop on communication messages through the switch to gather additional information about a device to aid the administrator in making decisions on a device's relationships/permissions as well as aid the filtering to be more efficient at performing its operations. These mechanisms are listed in the table below.

other network traffic. This helps to ensure the lowest latency from the device to its intended target whether that is the internet or another device.

Figure 16:
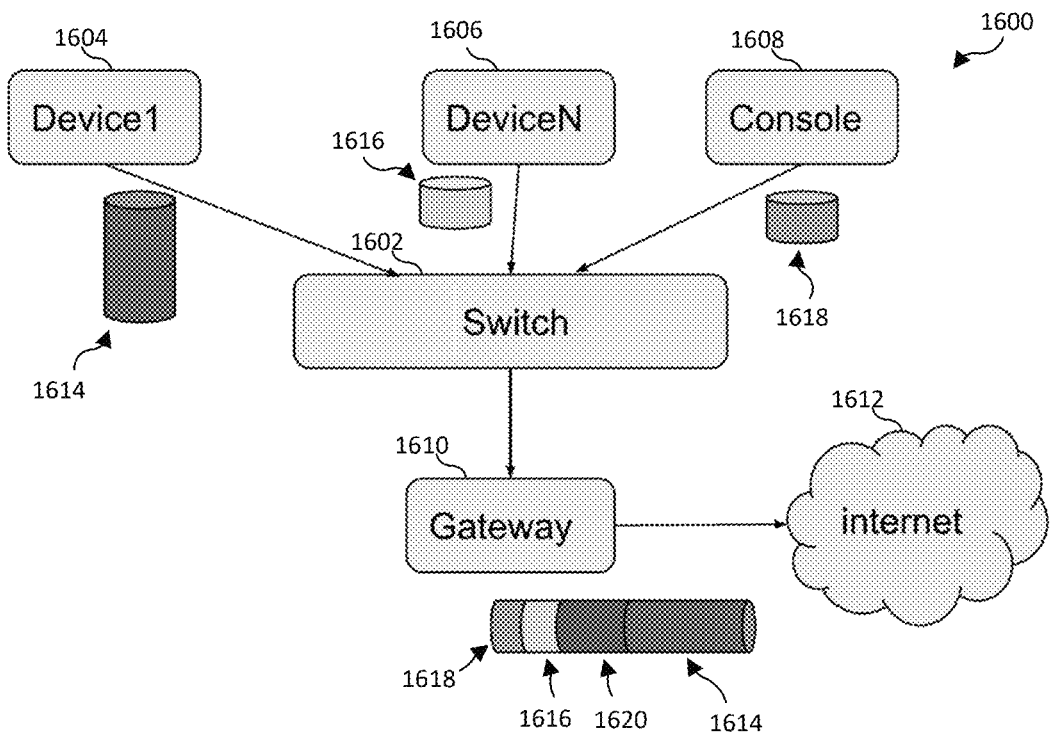
FIG. 16 shows how traffic prioritization and quality of service was implemented in a computer network according to the prior art.

A typical switch problem is depicted in FIG. 16 where a plurality of devices 1604, 1606, 1608 are sending packets to a gateway 1610 via a switch 1602. As device 1604 is transferring its packet 1614 to the switch 1602 so it can be forwarded to the gateway 1610, other devices are added which transfer packets 1616 and 1620 to the gateway 1610. At some point, the switch 1602 receives a packet 1618 from a gaming console 1608. Since all devices are communicating with the gateway 1610, the packets are sequenced in the order received from the devices 1604, 1606. As a result, the console's packet 1618 must wait in the switch 1602 until the packets 1614, 1620, 1616 from the devices are transmitted to the gateway 1610. This results in jitter latency in the transmission of the packet 1618 from the console 1608.

Figure 17:
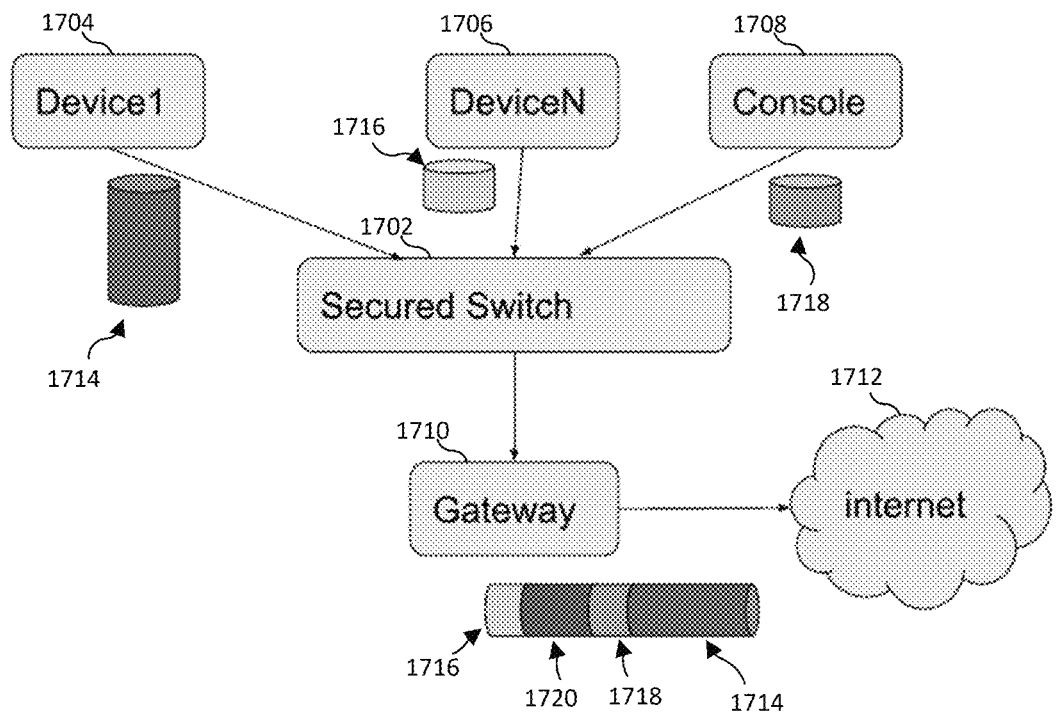
FIG. 17 shows an example of how a secured switch handles traffic prioritization and quality of service in a computer network.

With good device classification, a secured switch can implement various prioritization schemes so that transmission bandwidth can be prioritized for different uses. For example, if the secured switch knows that a device is a gaming console or video streaming device, the secured switch can be configured to prioritize traffic from these devices in order to provide a higher quality of service for these device which can improve performance for users. When the secured switch receives packets from a device requiring a higher quality of service, the secured switch can insert the packets into the transmission sequence before packets from other devices which do not require a high quality of service. For example, FIG. 17 shows how traffic can be prioritized in a situation similar to the one shown in FIG. 16 where packets are received by a secured switch 1702 from a plurality of devices 1704, 1706, 1708 with one of the devices 1708 being a gaming console. The secured switch 1702 is configured to implement a prioritization

| Service to Snoop | Purpose |
|---|---|
| DHCP | DHCP is primarily snooped to determine device hostname, IP address mapping, and vendor class identifier. This information can then be passed to the administrator to make more informed decisions about a device.<br>DHCP is also snooped to detect bad actors in the network. For example, a rogue device acting as a DHCP server. |
| VLAN | VLAN tags will be snooped to help identify VLANs already in use within the network to aid the administrator in configuration. In addition, the secured switch can use the VLAN tags identified between devices to ensure devices can communicate if required even if badly configured (e.g. device A in on VLAN A while device B is on VLAN B), and conversely can enforce VLAN segmentation at a device/MAC level if so required. |
| IGMP | The switch will snoop IGMP v2 and v3 messages to determine if there are subscribed devices and ensure multicast messaging between identified devices does occur with minimal intervention by the administrator. |
| MLD | Same as IGMP. |
| ICMP | ICMP will be sniffed for both Neighbor discovery but also Router Advertisement to detect rogue devices on the network similar to DHCP. |
| mDNS | mDNS will be snooped for services advertised by devices to allow better identification of the device type, providing the administrator with better knowledge of the devices they are managing. |

Traffic Prioritization/Quality of Service

In addition to the security features with the secured switch, the secured switch will also allow for some QoS adjustments based on input from the administrator. The secured switch may provide a number of default device classifications, e.g., gaming, video, and the like, and will attempt, where possible, to identify devices that fall under the default classifications, such as gaming consoles, streaming devices, etc. Packets can then be prioritized from these devices through the switch, so they are not swamped by scheme based on device classifications to ensure that traffic from device classes having a higher priority is inserted in the transmission sequence before traffic from device classes having a lower priority. In this example, gaming consoles have higher priority than other devices, such as devices 1704, 1706. Device classification enables the secured switch to know that device 1708 is a gaming console so that a packet 1718 from device 1708 destined to the internet 1712 via the gateway 1710 can be inserted into the transmission sequence in the next available slot rather than having to wait for the transmission of the packets from all the other devices to be completed, thus ensuring a desired QoS for the console. In the example of FIG. 17, the packet 1718 from console 1708 is received after the packets 1714, 1716, 1720. Packet 1714 from device 1704 has been inserted into the transmission queue before packet 1718 so packet 1714 is first in the queue. Packet 1718 is inserted into the next available slot which is after packet 1714. Packets 1716 and 1720 are inserted into the queue after packet 1718 in the order they are received. Similar mechanisms are also valid for use with device-to-device communication in the network, e.g., DVR to TV or Camera to NVR.

User App/Interface

The secured switch is responsible for data collection, rule enforcement, management and monitoring. The secured switch includes a user interface application that is configured to collect network data, analyze network data, and display various views of network information and collected data on a display screen of a computing device (e.g., desktop, laptop, tablet, smart phone, etc.). The user interface application provides user interface controls which enable users to interact with the functionality of the switch to perform various network administration operations, such as adding/removing devices from the network, configuring and reconfiguring devices. Once a device connects to the switch (and thus to the network), the device will start attempting to communicate at which point the secured switch will be able to gather substantial information about the device, such as its unique MAC address, its hostname (from DHCP), where in the network it was connected, mDNS services broadcast by the device, a list of subscribed multicast groups, etc., Much of this happens within the first few milliseconds a device boots and connects, much faster than a user clicking a refresh button, or opening an app on a phone or computer. In addition to the information provided by the secured switch, the application performs some additional logic to determine the vendor (from the MAC address).

Figure 18A:
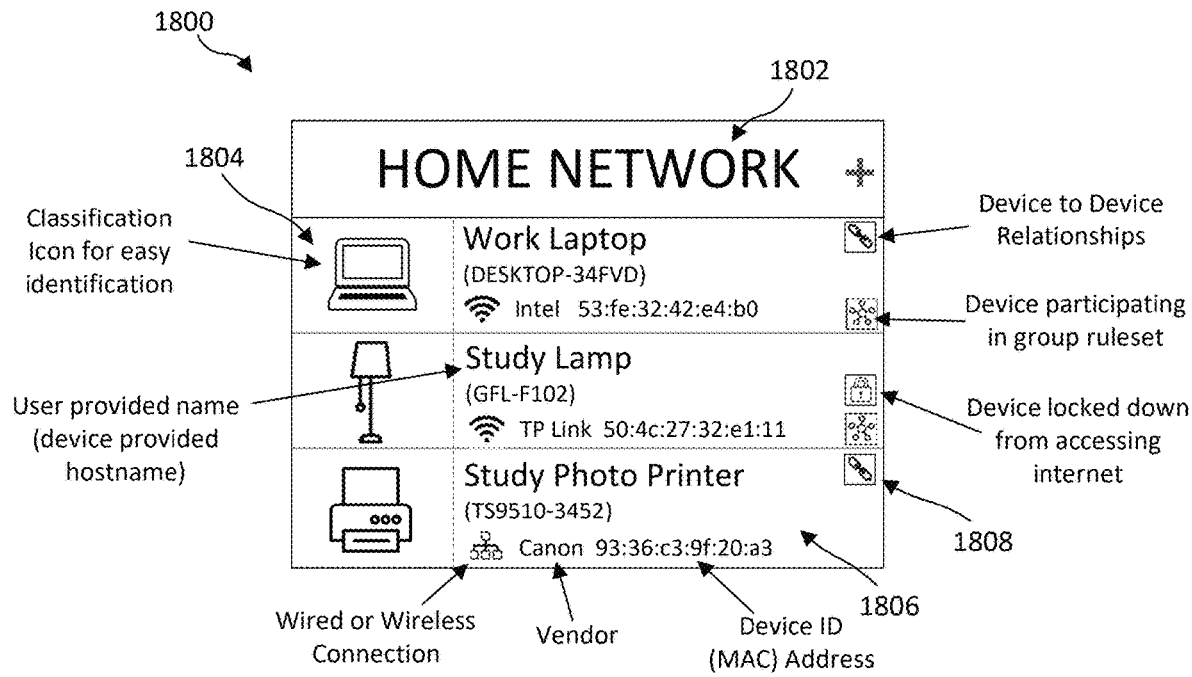
FIGS. 18A-18C show example user interfaces for a secured switch.

An example implementation of a user interface 1800 for a secured smart switch is shown in FIG. 18A. The user interface includes a text field 1802 that shows the network name which can be input by a user or discovered from network devices during a setup process. The user interface 1800 includes a list of devices that have been added to the home network. The user interface includes fields for displaying various items of information pertaining to each device. In the example of FIG. 18A, each device in the list includes a device icon region 1804, device information region 1806, and a status region 1808. The device icon region 1804 for a device shows an icon or symbol that represents that device. The user interface application can include a plurality of default device icons/symbols which can be automatically used in association with corresponding device types. In some implementations, the user interface application may enable users to select and/or upload an icon, symbol, image, or the like to use as the icon for the device. The device information region 1806 for a device displays identification information, such as user provided device name, device provided hostname, vendor/manufacturer name, device ID (e.g., MAC address), and connection type (e.g., wired or wireless). This information can be entered by a user and/or discovered by the secured switch. The status region 1808 for a device displays information regarding the current status of the device, such as device to device relationships (e.g., links), whether a device is participating in a group ruleset, whether a device is locked down from accessing the internet, and the like. As seen in FIG. 18A, the information in the status region 1808 is indicated by icons or symbols. In various implementations, these icons can be clicked on to access more detailed information pertaining to the status indicated by the icon.

Device Classification

The application may also provide an interface to enable an administrator to define device classifications for devices. A device classification can be a device type (e.g., printer, laptop, gaming console, video camera, storage, etc.) a device group (e.g., work group, personal group, IoT group, etc.). Rules can then be assigned to each classification which indicate the settings, permissions, and the like to be applied to the devices in each classification. For example, a rule for a given class of devices can specify that devices in the class can communicate with devices of another predetermined class (e.g., the device class can talk to the internet), devices in the class can communicate with a singular device (e.g., the device class can talk to a specific printer), devices in a class are allowed to communicate with each other or not allowed to communicate with each other. On creation of the classification, the application will communicate with the secured switch and set up the necessary filters and rules associated with the required behavior. In addition to administrator assigned classifications the secured switch and app will have a default set of classifications such as gaming, printer, internet, etc. which the switch will attempt to classify automatically where possible.

Figure 18B:
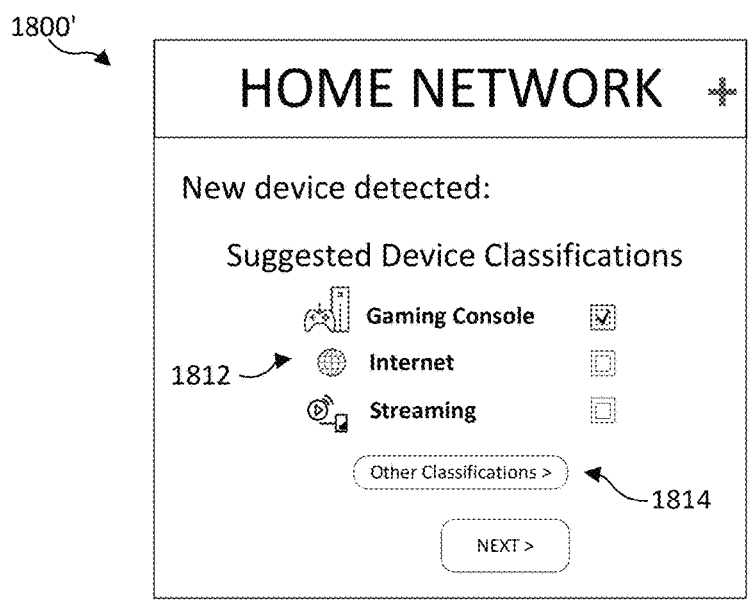
Figure 19:
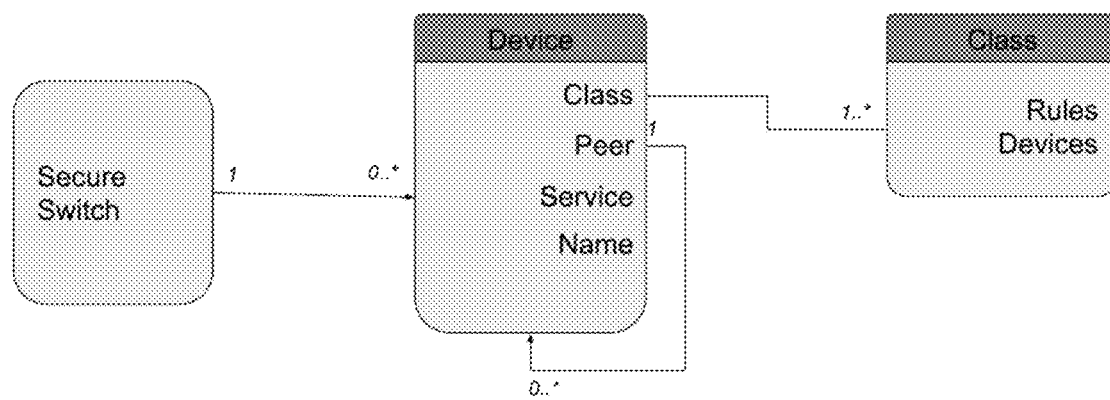
FIG. 19 shows an example of how device configuration and classification information is handled by a secured switch.

The user interface application is programmed to collect and analyze various types of information pertaining to a device being added to the network information to facilitate classification and setup of the device by an administrator. An example implementation of a user interface 1800' which can be displayed to facilitate the adding and classification of a new device for a network is shown in FIG. 18B. When the secured switch detects a new device attempting to communicate on the network, the user interface 1800' is displayed to indicate to a user that a new device has been detected. Based on the information collected from the device by the switch and additional information which has been derived therefrom, the user interface application determines one or more possible classifications 1812 for the device which are presented as selectable options. Options for manually selecting classifications, groups, relationships, etc. may also be presented to the user. As shown in FIG. 19, with the classification/group/relationships established in the application, the information is sent to the secured switch which stores the peer relationships and classification/group information for future user (e.g., reboots), and applies the updates to the device internals to ensure the designated device relationships, rules and permissions are all implemented in the device. FIG. 19 shows an example data structure/schema which can be used by the secured switch for device classification and relationship information.

Device Heuristics/Patterns

To aid in device classification and identification, the secured switch and the user interface application gathers additional information and analyzes the information against known patterns to better identify what kind of device is found on the network, and what devices it is likely going to want access to. The information that can be collected and analyzed to determine possible classifications include, for example, MAC address OUI which can indicate the vendor/manufacturer of a device, servers a device communicates with (e.g., communicating with gaming servers can indicate a gaming device), the user of certain naming conventions which can be characteristic of particular vendors/manufacturers, services advertised on mDNS (e.g., printing services), and characteristics of identifiers or addresses which can be indicative of types of devices (e.g., a device has a MAC address in which the $2^{nd}$ bit has a value indicating a random MAC address (examples x2:xx:xx:xx:xx or x6:xx:xx:xx:xx) which are typically used for mobile devices).

Figure 18C:
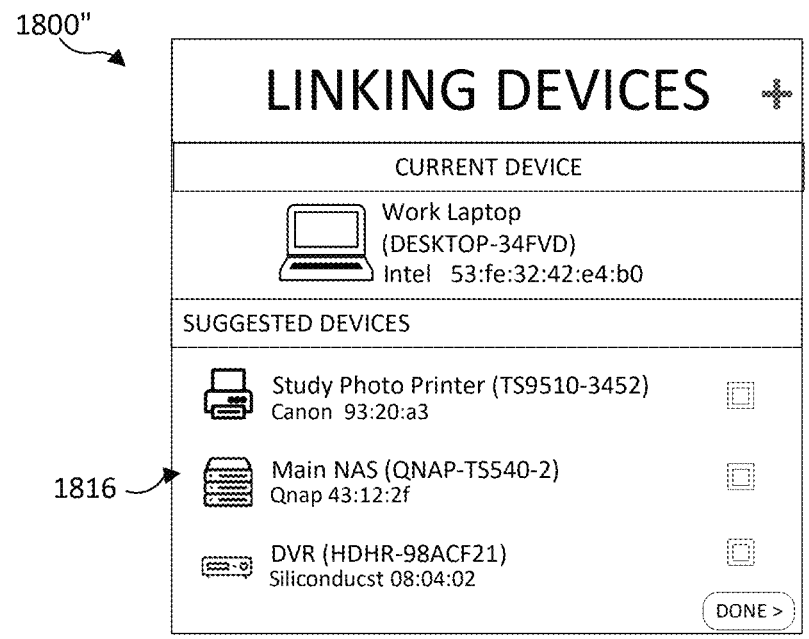

The application can present a user interface that enables device to device relationships to be quickly defined for the network. An example implementation of such an interface 1800" is shown in FIG. 18C. A current device selected from the device list for the network (e.g., FIG. 18A) is presented in the interface along with a list 1816 of other devices which can be selected to link to the current device. The use of visual representations of the devices enables more intuitive configuring and linking of devices as an administrator can see device types and know which devices to link to without having to refer to MAC addresses or IP addresses to determine what a device is and what it is doing. In addition, when an issue occurs with a device, the application can automatically present the visual representation of the device which will allow the administrator to quickly confirm if things are configured correctly.

Certification/Audit

To complement the security aspects of the secured switch, the application provides a suite of tools to audit and certify that security is being met within the network as needed. The first form of auditing will be a number of checks that the application will perform on data provided by the secured switch to determine if there are security holes in the topology setup by the user that deserve some attention. Examples situation that the application may be programmed to identify include:

The user has device rules set up for two different devices but does not specifically create a peering relationship indicating these devices should be isolated. The secured switch can detect that both devices are on a single port so the secured switch cannot enforce isolation.

The user has a number of banned devices in the database, and, while the number of devices is not increasing, the number of received packets continues to increase. This can be indicative of routine attacks, a compromised network, or just bad management.

In addition to the localized auditing, additional auditing can be implemented for remote work/enterprise where the user/admin can subscribe to upload statistics from the secured switch(es) around a certain device (or devices) to a service in the cloud. That data can then be audited for security issues by both the user and approved 3rd parties to ensure security/isolation is being maintained by both the user and checking for compromised networking. As an example, a remote worker needs to ensure a device loaned from their workspace is only connected to the internet for VPN access and not accessing or being accessed by any other devices in the network unless pre-approved.

In addition to the auditing, the secured switch audit service can work with interested parties to determine a set of certification standards/requirements to audit the data against in order to certify users are meeting device and security standards required. For example, a tax accountant working on IRS data that requires the device to be completely isolated from the rest of the home network can allow data to be provided to the service, and that data can be audited, and a certificate of compliance issued.

Multi-Secured Switch Network

Figure 20:
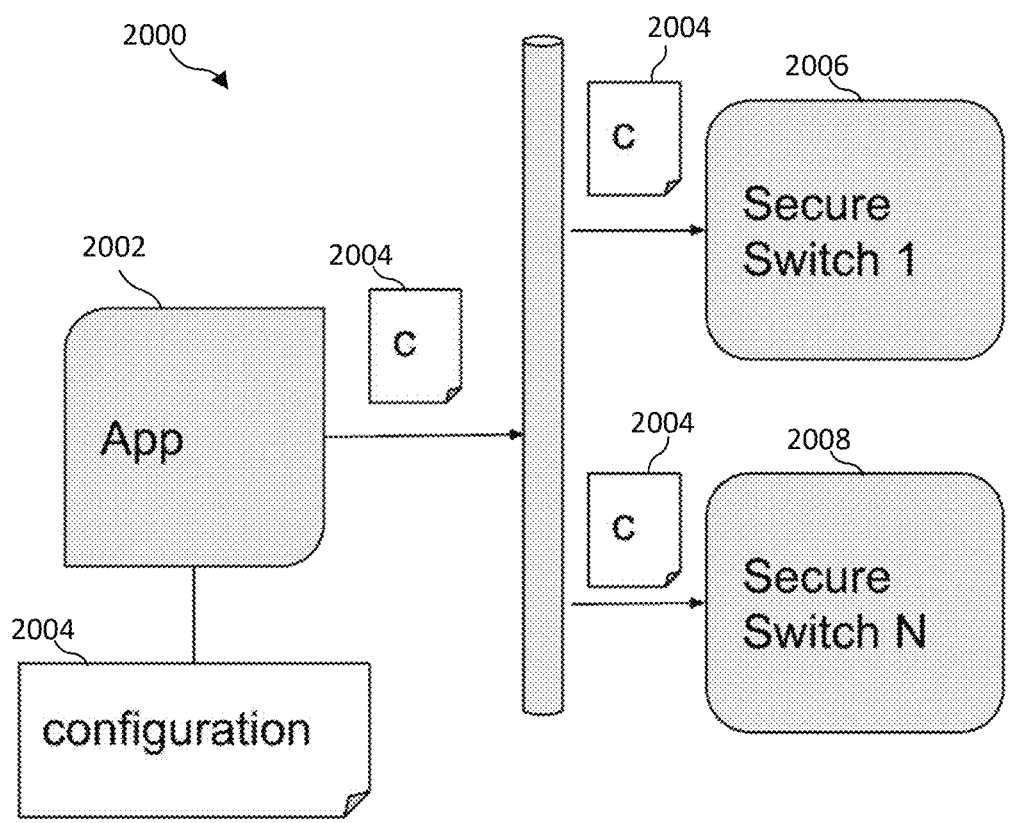
FIG. 20 shows an example of how configuration information is shared to all secured switches in a network so that each switch has the same configuration.

Referring to FIG. 20, in a network with two or more secured switches, such as the network 2000 of FIG. 20 which has two secured switches 2006, 2008, the application 2002 ensures that every switch has the same configuration information 2004. The configuration information includes the device configurations, permissions, relationships and the like which have already been defined for the network. Since all the secured switches have the same configuration information, each secured switch knows the settings for each device so that the integrity of the secured network can be maintained in situations, such as when a device moves between switches (e.g., from one Wi-Fi connection to another). On detecting device movement between switches (and/or switch ports) that have not been associated with Wi-Fi Access Points, the application can generate an alert via the user interface to notify the administrator and confirm that the move was intended. The approach of ensuring each and every switch has the exact same configuration will help in reducing the superfluous network traffic overhead. Only permitted communications will be allowed through the switch, and multicast traffic will get more and more granular as it gets closer to the intended recipients. An example of this scenario is shown in FIG. 21.

Figure 21:
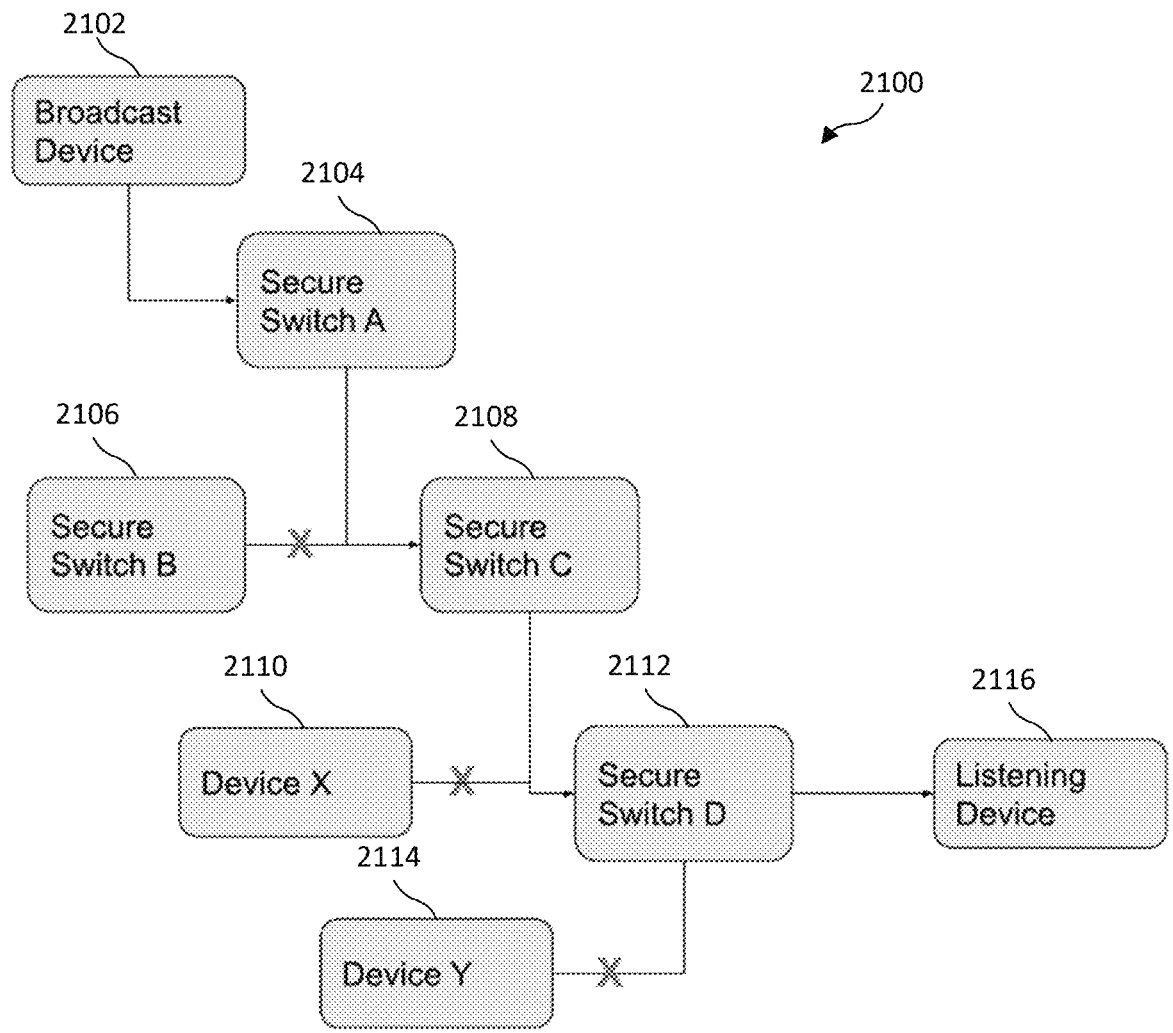
FIG. 21 shows how multiple secured switches in a computer network handle multicast traffic.

FIG. 21 shows an example network configuration 2100 that includes a plurality of secured switches 2104, 2106, 2108, 2112, a broadcast device 2102, a target listening device 2116, and other (non-target) devices 2110, 2114. The broadcast device 2102 transmits a broadcast message. Because each of the secured switches has the same configuration information, each of the secured switches knows that the listening device 2116 has a defined relationship with broadcast device 2102 and therefore can receive the broadcast message. In addition, each of the secured switches knows that the listening device is on the output port of secured switch 2112, that secured switch 2112 is on the output port of secured switch 2108, that the secured switch 2108 is on the output port of secured switch 2104, and that the secured switch 2104 is connected to the broadcast device 2102. The secured switch 2104 therefore can forward the broadcast message to the secured switch 2108. If the message is received by the secured switch 2106, the secured switch 2106 will drop the message. The secured switch 2108 forwards the broadcast message to secured switch 2112, and the secured switch 2112 forwards the broadcast message to the listening device 2116. The secured switches do not forward the message to device 2110 or device 2114 because these devices do not have a relationship with the broadcast device 2102. Superfluous network traffic is thus avoided which saves resources and network bandwidth for essential traffic.

Figure 22:
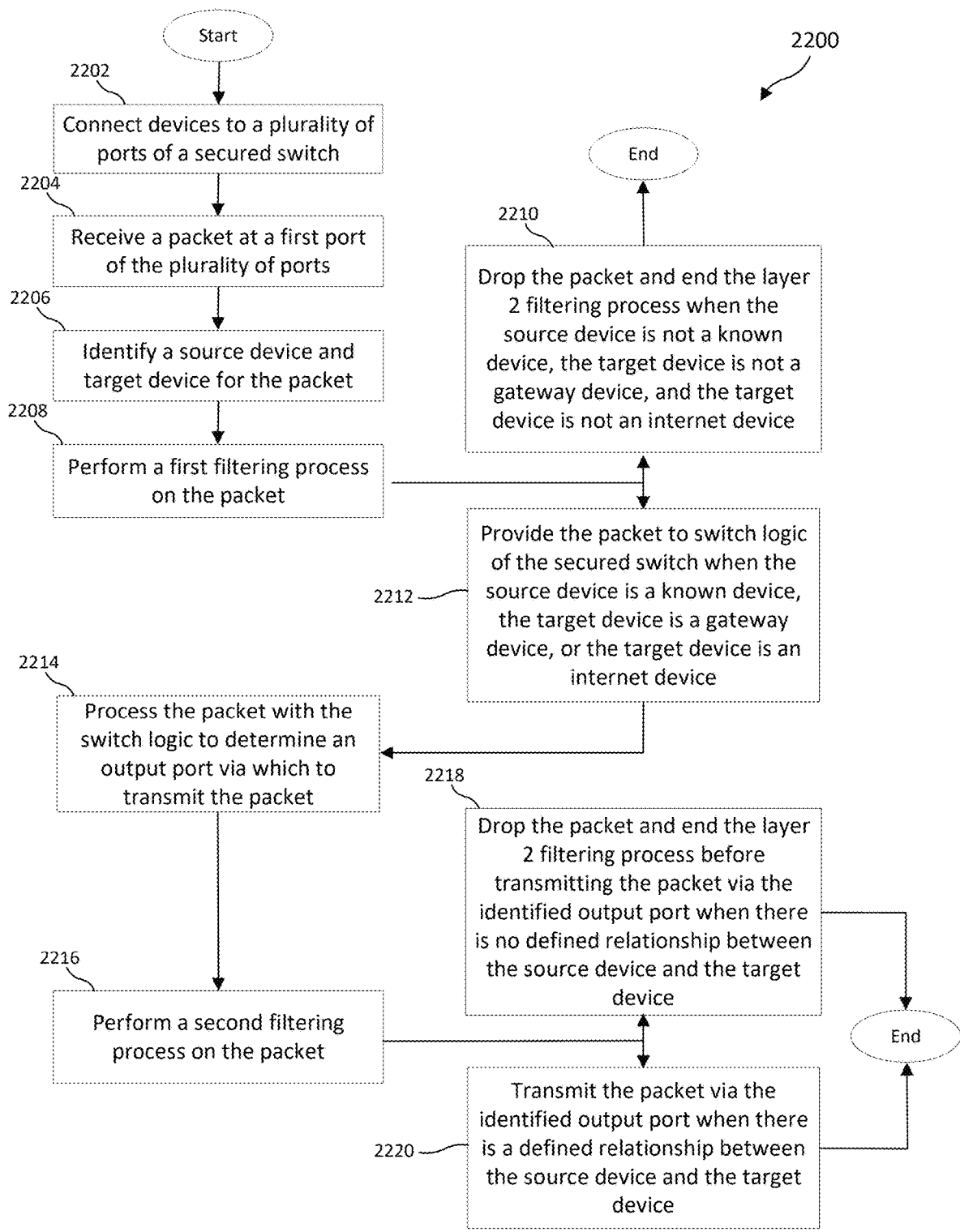
FIG. 22 is a flowchart of an example method of processing traffic using a secured switch according to this disclosure.

FIG. 22 is a flowchart of an example method 2200 of handling network traffic using a secured switch. The method includes connecting devices to a plurality of ports of a secured switch (block 2202). The ports include a gateway port connected to a gateway device (and the internet). A packet is received at a first port of the plurality of ports (block 2204), and a source device and target device for the packet are identified (block 2206). The secured switch performs a first filtering process of a layer 2 filtering process on the packet (block 2208). The first filtering process includes dropping the packet and ending the layer 2 filtering process when the source device is not a known device, the target device is not a gateway device, and the target device is not an internet device (block 2210), and providing the packet to switch logic of the secured switch when the source device is a known device, the target device is a gateway device, or the target device is an internet device (block 2212). When the packet is provided to the switch logic, the switch logic processes the packet to determine an output port of the secured switch via which to transmit the packet (block 2214). After processing the packet with the switch logic, a second filtering process of the layer 2 filtering process is performed (block 2216). The second filtering process includes dropping the packet and ending the layer 2 filtering process before transmitting the packet via the identified output port when there is no defined relationship between the source device and the target device (block 2218) and transmitting the packet via the identified output port when there is a defined relationship between the source device and the target device (block 2220).

Figure 23:
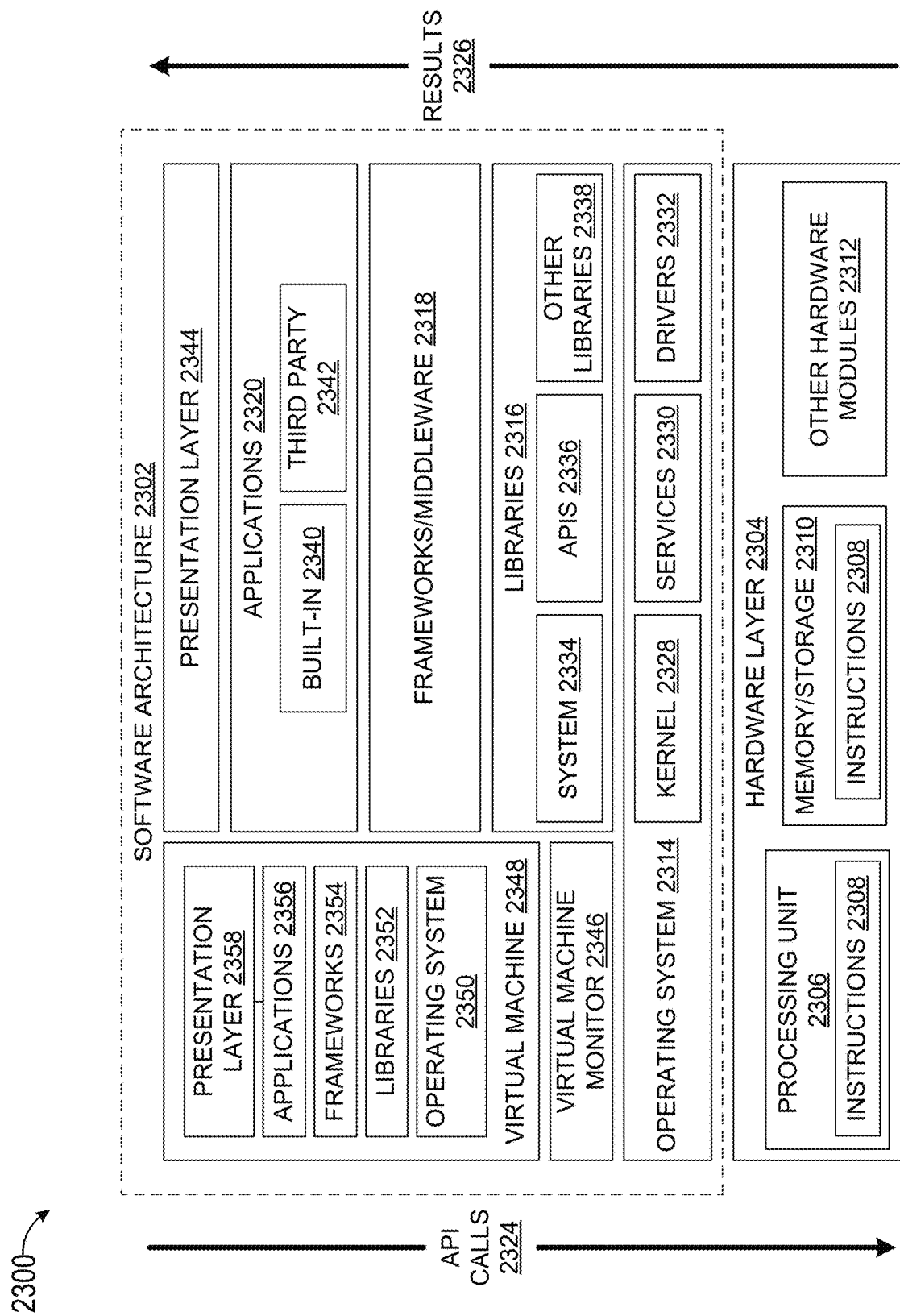
FIG. 23 is a block diagram showing an example software architecture, various portions of which may be used in conjunction with various hardware architectures herein described, which may implement any of the features described herein.

FIG. 23 is a block diagram 2300 illustrating an example software architecture 2302, various portions of which may be used in conjunction with various hardware architectures herein described, which may implement any of the above-described features. FIG. 23 is a non-limiting example of a software architecture and it will be appreciated that many other architectures may be implemented to facilitate the functionality described herein. The software architecture 2302 may execute on hardware such as a machine 2400 of FIG. 24 that includes, among other things, processors 2410, memory 2430, and input/output (I/O) components 2450. A representative hardware layer 2304 is illustrated and can represent, for example, the machine 2400 of FIG. 24. The representative hardware layer 2304 includes a processing unit 2306 and associated executable instructions 2308. The executable instructions 2308 represent executable instructions of the software architecture 2302, including implementation of the methods, modules and so forth described herein. The hardware layer 2304 also includes a memory/storage 2310, which also includes the executable instructions 2308 and accompanying data. The hardware layer 2304 may also include other hardware modules 2312. Instructions 2308 held by processing unit 2306 may be portions of instructions 2308 held by the memory/storage 2310.

The example software architecture 2302 may be conceptualized as layers, each providing various functionality. For example, the software architecture 2302 may include layers and components such as an operating system (OS) 2314, libraries 2316, frameworks 2318, applications 2320, and a presentation layer 2344. Operationally, the applications 2320 and/or other components within the layers may invoke API calls 2324 to other layers and receive corresponding results 2326. The layers illustrated are representative in nature and other software architectures may include additional or different layers. For example, some mobile or special purpose operating systems may not provide the frameworks/middleware 2318.

The OS 2314 may manage hardware resources and provide common services. The OS 2314 may include, for example, a kernel 2328, services 2330, and drivers 2332. The kernel 2328 may act as an abstraction layer between the hardware layer 2304 and other software layers. For example, the kernel 2328 may be responsible for memory management, processor management (for example, scheduling), component management, networking, security settings, and so on. The services 2330 may provide other common services for the other software layers. The drivers 2332 may be responsible for controlling or interfacing with the underlying hardware layer 2304. For instance, the drivers 2332 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 2316 may provide a common infrastructure that may be used by the applications 2320 and/or other components and/or layers. The libraries 2316 typically provide functionality for use by other software modules to perform tasks, rather than rather than interacting directly with the OS 2314. The libraries 2316 may include system libraries 2334 (for example, C standard library) that may provide functions such as memory allocation, string manipulation, file operations. In addition, the libraries 2316 may include API libraries 2336 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 2316 may also include a wide variety of other libraries 2338 to provide many functions for applications 2320 and other software modules.

The frameworks 2318 (also sometimes referred to as middleware) provide a higher-level common infrastructure that may be used by the applications 2320 and/or other software modules. For example, the frameworks 2318 may provide various graphic user interface (GUI) functions, high-level resource management, or high-level location services. The frameworks 2318 may provide a broad spectrum of other APIs for applications 2320 and/or other software modules.

The applications 2320 include built-in applications 2340 and/or third-party applications 2342. Examples of built-in applications 2340 may include, but are not limited to, a contacts application, a browser application, a location application, a media application, a messaging application, and/or a game application. Third-party applications 2342 may include any applications developed by an entity other than the vendor of the particular platform. The applications 2320 may use functions available via OS 2314, libraries 2316, frameworks 2318, and presentation layer 2344 to create user interfaces to interact with users.

Some software architectures use virtual machines, as illustrated by a virtual machine 2348. The virtual machine 2348 provides an execution environment where applications/modules can execute as if they were executing on a hardware machine (such as the machine 2400 of FIG. 24, for example). The virtual machine 2348 may be hosted by a host OS (for example, OS 2314) or hypervisor, and may have a virtual machine monitor 2346 which manages operation of the virtual machine 2348 and interoperation with the host operating system. A software architecture, which may be different from software architecture 2302 outside of the virtual machine, executes within the virtual machine 2348 such as an OS 2314, libraries 2352, frameworks 2354, applications 2356, and/or a presentation layer 2358.

Figure 24:
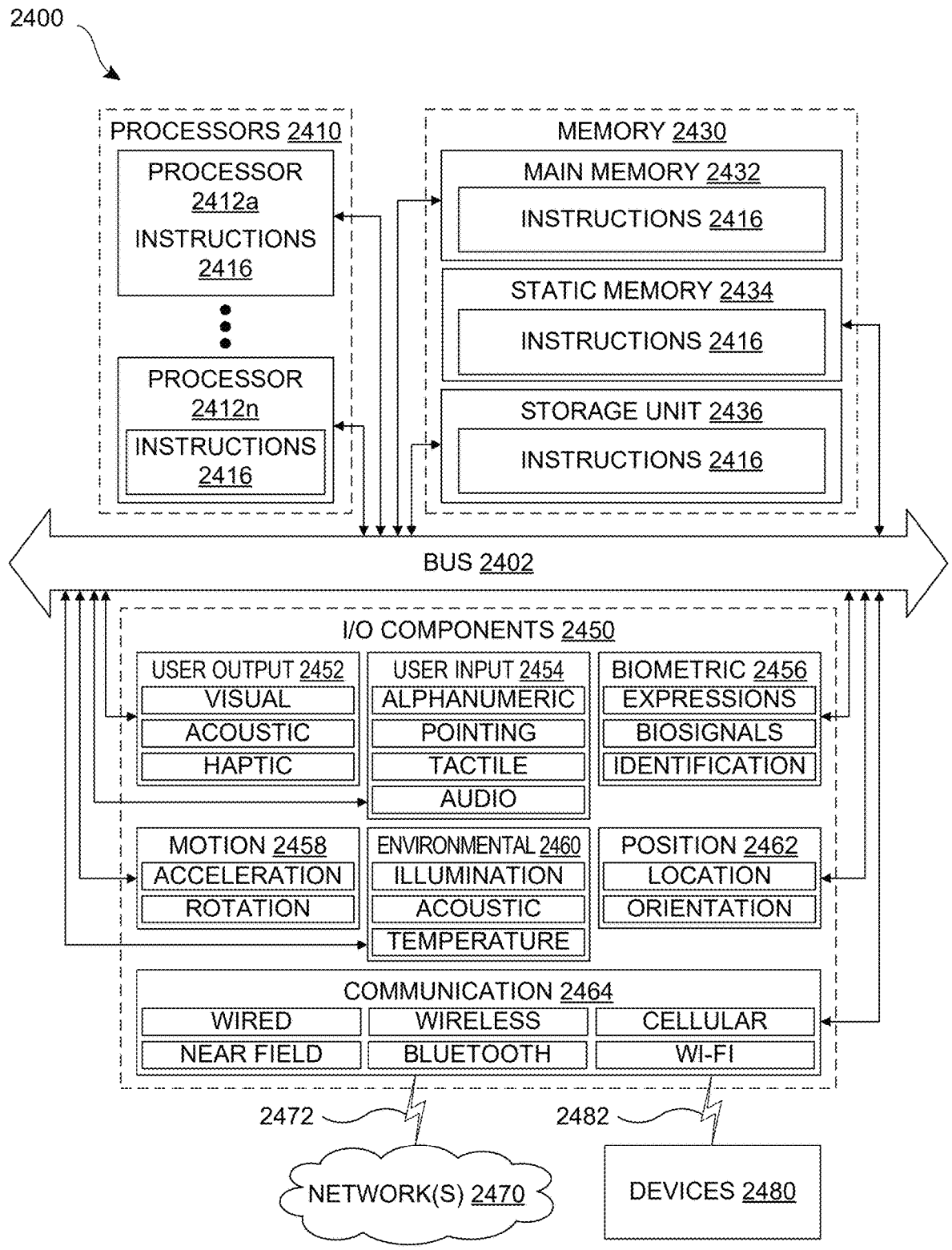
FIG. 24 is a block diagram showing components of an example machine configured to read instructions from a machine-readable medium and perform any of the features described herein.

FIG. 24 is a block diagram illustrating components of an example machine 2400 configured to read instructions from a machine-readable medium (for example, a machine-readable storage medium) and perform any of the features described herein. The example machine 2400 is in a form of a computer system, within which instructions 2416 (for example, in the form of software components) for causing the machine 2400 to perform any of the features described herein may be executed. As such, the instructions 2416 may be used to implement modules or components described herein. The instructions 2416 cause unprogrammed and/or unconfigured machine 2400 to operate as a particular machine configured to carry out the described features. The machine 2400 may be configured to operate as a standalone device or may be coupled (for example, networked) to other machines. In a networked deployment, the machine 2400 may operate in the capacity of a server machine or a client machine in a server-client network environment, or as a node in a peer-to-peer or distributed network environment.

Machine 2400 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 2400 is illustrated, the term "machine" includes a collection of machines that individually or jointly execute the instructions 2416.

The machine 2400 may include processors 2410, memory 2430, and I/O components 2450, which may be communicatively coupled via, for example, a bus 2402. The bus 2402 may include multiple buses coupling various elements of machine 2400 via various bus technologies and protocols. In an example, the processors 2410 (including, for example, a central processing unit (CPU), a graphics processing unit (GPU), a digital signal processor (DSP), an ASIC, or a suitable combination thereof) may include one or more processors 2412a to 2412n that may execute the instructions 2416 and process data. In some examples, one or more processors 2410 may execute instructions provided or identified by one or more other processors 2410. The term "processor" includes a multi-core processor including cores that may execute instructions contemporaneously. Although FIG. 24 shows multiple processors, the machine 2400 may include a single processor with a single core, a single processor with multiple cores (for example, a multi-core processor), multiple processors each with a single core, multiple processors each with multiple cores, or any combination thereof. In some examples, the machine 2400 may include multiple processors distributed among multiple machines.

The memory/storage 2430 may include a main memory 2432, a static memory 2434, or other memory, and a storage unit 2436, both accessible to the processors 2410 such as via the bus 2402. The storage unit 2436 and memory 2432, 2434 store instructions 2416 embodying any one or more of the functions described herein. The memory/storage 2430 may also store temporary, intermediate, and/or long-term data for processors 2410. The instructions 2416 may also reside, completely or partially, within the memory 2432, 2434, within the storage unit 2436, within at least one of the processors 2410 (for example, within a command buffer or cache memory), within memory at least one of I/O components 2450, or any suitable combination thereof, during execution thereof. Accordingly, the memory 2432, 2434, the storage unit 2436, memory in processors 2410, and memory in I/O components 2450 are examples of machine-readable media.

As used herein, "machine-readable medium" refers to a device able to temporarily or permanently store instructions and data that cause machine 2400 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 2416) for execution by a machine 2400 such that the instructions, when executed by one or more processors 2410 of the machine 2400, cause the machine 2400 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 2450 may include a wide variety of hardware components adapted to receive input, provide output, produce output, transmit information, exchange information, capture measurements, and so on. The specific I/O components 2450 included in a particular machine will depend on the type and/or function of the machine. For example, mobile devices such as mobile phones may include a touch input device, whereas a headless server or IoT device may not include such a touch input device. The particular examples of I/O components illustrated in FIG. 24 are in no way limiting, and other types of components may be included in machine 2400. The grouping of I/O components 2450 are merely for simplifying this discussion, and the grouping is in no way limiting. In various examples, the I/O components 2450 may include user output components 2452 and user input components 2454. User output components 2452 may include, for example, display components for displaying information (for example, a liquid crystal display (LCD) or a projector), acoustic components (for example, speakers), haptic components (for example, a vibratory motor or force-feedback device), and/or other signal generators. User input components 2454 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 2450 may include biometric components 2456, motion components 2458, environmental components 2460, and/or position components 2462, among a wide array of other physical sensor components. The biometric components 2456 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 2458 may include, for example, acceleration sensors (for example, an accelerometer) and rotation sensors (for example, a gyroscope). The environmental components 2460 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 2462 may include, for example, location sensors (for example, a Global Position System (GPS) receiver), altitude sensors (for example, an air pressure sensor from which altitude may be derived), and/or orientation sensors (for example, magnetometers).

The I/O components 2450 may include communication components 2464, implementing a wide variety of technologies operable to couple the machine 2400 to network(s) 2470 and/or device(s) 2480 via respective communicative couplings 2472 and 2482. The communication components 2464 may include one or more network interface components or other suitable devices to interface with the network(s) 2470. The communication components 2464 may include, for example, components adapted to provide wired communication, wireless communication, cellular communication, Near Field Communication (NFC), Bluetooth communication, Wi-Fi, and/or communication via other modalities. The device(s) 2480 may include other machines or various peripheral devices (for example, coupled via USB).

In some examples, the communication components 2464 may detect identifiers or include components adapted to detect identifiers. For example, the communication components 2464 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 2464, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A secured network switch for computer networks, the secured network switch comprising:
   a processor; and
   a memory in communication with the processor, the memory comprising executable instructions that, when executed by the processor alone or in combination with other processors, cause the secured network switch to perform functions of:
   receiving a packet at a first port of a plurality of ports of the secured network switch, the ports including a gateway port connected to a gateway device;
   identifying a source device and a target device for the packet;
   performing, using the secured network switch, a first filtering process of a layer 2 filtering process on the packet, the first filtering process including:
   dropping the packet and ending the layer 2 filtering process when the source device is a banned device or if the source device is not a known device and the target device is not a gateway, a Domain Name System (DNS), or Dynamic Host Configuration Protocol (DHCP) device; and providing the packet to switch logic of the secured network switch when the source device is a known device or the target device is a gateway, DNS, or DHCP device;

in response to providing the packet to the switch logic, processing the packet with the switch logic to identify an output port of the secured network switch via which to transmit the packet; and after processing the packet with the switch logic, performing a second filtering process of the layer 2 filtering process, the second filtering process including:

dropping the packet and ending the layer 2 filtering process before transmitting the packet via the identified output port when there is no defined relationship between the source device and the target device; and transmitting the packet via the identified output port when there is a defined relationship between the source device and the target device.

2. The secured network switch of claim 1, wherein the functions further comprise:

when the source device is an unknown device, generating a notification via a user interface that a new device has been connected to the secured network switch; and providing options for defining a classification and/or settings for the new device via the user interface.

3. The secured network switch of claim 1, further comprising:

using at least one packet sniffing component to collect classification information for devices connected to the secured network switch from service messages communicated via the secured network switch, wherein the service messages include at least one of Dynamic Host Configuration Protocol (DHCP) messages, multicast Domain Name Service (mDNS) messages, Address Resolution Protocol (ARP) messages for Internet Protocol (IP) v6, Neighbor Discovery Protocol (NDP) messages for IPV6, Internet Group Management Protocol (IGMP) messages, and Multicast Listener Discovery (MLD) for IPV6.

4. The secured switch of claim 1, wherein the functions further comprise:

performing a security auditing process of at least one network across all connected secured network switches, the security auditing process including at least one of:

processing rulesets and device relationships defined in the secured network switches to identify rule conflicts;

monitoring a number of received packets in relation to number of devices connected to the at least one network to detect conditions indicative of a cyber-attack, a compromised network, and/or a network management issue; and monitoring traffic to and from devices to detect violations of rules defined for the devices.

5. The secured network switch of claim 1, wherein the second filtering process further comprises:

dropping the packet and ending the layer 2 filtering process before transmitting the packet via the identified output port when there is no defined relationship between the source device and the target device; and transmitting the packet via the identified output port when there is a defined relationship between the source device and the target device or the target device is a gateway, DNS, or DHCP device.

6. The secured network switch of claim 5, wherein the second filtering process further comprises:

determining whether the source device has been assigned to any predefined classification/group;

in response to the source device being assigned to a predefined classification/group, determining whether a relationship between the source device and the target device is defined by a ruleset associated with the predefined classification/group.

7. The secured network switch of claim 1, wherein transmitting the packet further comprises:

identifying a classification/group to which the source device has been assigned;

determining a priority level associated with the identified classification/group; and inserting the packet into a transmission sequence based on the priority level of the source device.

8. The secured network switch of claim 7, wherein the classification/group to which the source device has been assigned is one of a gaming console and/or a video streaming device.

9. The secured switch of claim 1, wherein the functions further comprise:

when the source device is an unknown device, generating a notification via a user interface that a new device has been connected to the secured network switch;

analyzing the collected classification information pertaining to the source device to determine at least one suggested classification for the source device; and presenting the suggested classification for the source device via the user interface with options for associating the suggested classification with the source device.

10. The secured network switch of claim 9, wherein the at least one suggested classification is determined based on one or more of an Organizationally Unique Identifier (OUI) from a Media Access Control (MAC) address associated with the source device, a service advertisement included in an mDNS message transmitted by the source device, and a device discovery message.

11. A method for a secured network switch, the method comprising:

receiving a packet at a first port of the plurality of ports of the secured network switch;

identifying a source device and a target device for the packet;

performing, using the secured network switch, a first filtering process of a layer 2 filtering process on the packet, the first filtering process including:

dropping the packet and ending the layer 2 filtering process when the source device is a banned device or if the source device is not a known device and the target device is not a gateway, a Domain Name System (DNS), or Dynamic Host Configuration Protocol (DHCP) device; and providing the packet to switch logic of the secured network switch when the source device is a known device or the target device is a gateway, DNS, or DHCP device;

in response to providing the packet to the switch logic, processing the packet with the switch logic to identify an output port of the secured network switch via which to transmit the packet; and after processing the packet with the switch logic, performing a second filtering process of the layer 2 filtering process, the second filtering process including:

dropping the packet and ending the layer 2 filtering process before transmitting the packet via the identified output port when there is no defined relationship between the source device and the target device; and transmitting the packet via the identified output port when there is a defined relationship between the source device and the target device.

12. The method of claim 11, wherein transmitting the packet further comprises:
identifying a classification/group to which the source device has been assigned;
determining a priority level associated with the identified classification/group; and
inserting the packet into a transmission sequence based on the priority level of the source device.

13. The method of claim 11, further comprising:
when the source device is an unknown device, generating a notification via a user interface that a new device has been connected to the secured network switch; and
providing options for defining a classification and/or settings for the new device via the user interface.

14. The method of claim 11, further comprising:
using at least one packet sniffing component to collect classification information for devices connected to the secured network switch from service messages communicated via the secured network switch,
wherein the service messages include at least one of Dynamic Host Configuration Protocol (DHCP) messages, multicast Domain Name Service (mDNS) messages, Address Resolution Protocol (ARP) messages for Internet Protocol (IP) v6, Neighbor Discovery Protocol (NDP) messages for IPV6, Internet Group Management Protocol (IGMP) messages, and Multicast Listener Discovery (MLD) for IPV6.

15. The method of claim 11, further comprising:
when the source device is an unknown device, generating a notification via a user interface that a new device has been connected to the secured network switch;
analyzing the collected classification information pertaining to the source device to determine at least one suggested classification for the source device; and
presenting the suggested classification for the source device via the user interface with options for associating the suggested classification with the source device.

16. The method of claim 11, wherein the second filtering process further comprises:
dropping the packet and ending the layer 2 filtering process before transmitting the packet via the identified output port when there is no defined relationship between the source device and the target device; and
transmitting the packet via the identified output port when there is a defined relationship between the source device and the target device or the target device is a gateway, DNS, or DHCP device.

17. The method of claim 16, wherein the second filtering process further comprises:
determining whether the source device has been assigned to any predefined classification/group;
in response to the source device being assigned to a predefined classification/group, determining whether a relationship between the source device and the target device is defined by a ruleset associated with the predefined classification/group.

18. A non-transitory computer readable medium on which are stored instructions that, when executed, cause a programmable device to perform functions of:
receiving a packet at a first port of the plurality of ports of the secured network switch;
identifying a source device and a target device for the packet;
performing, using the secured network switch, a first filtering process of a layer 2 filtering process on the packet, the first filtering process including:
dropping the packet and ending the layer 2 filtering process when the source device is a banned device or if the source device is not a known device and the target device is not a gateway, a Domain Name System (DNS), or Dynamic Host Configuration Protocol (DHCP) device; and
providing the packet to switch logic of the secured network switch when the source device is a known device or the target device is a gateway, DNS, or DHCP device;
in response to providing the packet to the switch logic, processing the packet with the switch logic to identify an output port of the secured network switch via which to transmit the packet; and
after processing the packet with the switch logic, performing a second filtering process of the layer 2 filtering process, the second filtering process including:
dropping the packet and ending the layer 2 filtering process before transmitting the packet via the identified output port when there is no defined relationship between the source device and the target device; and
transmitting the packet via the identified output port when there is a defined relationship between the source device and the target device.

19. The non-transitory computer readable medium of claim 18, wherein the second filtering process further comprises:
dropping the packet and ending the layer 2 filtering process before transmitting the packet via the identified output port when there is no defined relationship between the source device and the target device; and
transmitting the packet via the identified output port when there is a defined relationship between the source device and the target device or the target device is a gateway, DNS, or DHCP device.

20. The non-transitory computer readable medium of claim 19, wherein the second filtering process further comprises:
determining whether the source device has been assigned to any predefined classification/group;
in response to the source device being assigned to a predefined classification/group, determining whether a relationship between the source device and the target device is defined by a ruleset associated with the predefined classification/group.

* * * * *